United States Patent
Sato et al.

(10) Patent No.: US 12,201,909 B2
(45) Date of Patent: Jan. 21, 2025

(54) INFORMATION STORAGE MEDIUM PROGRAM, INFORMATION PROCESSING DEVICE, AND CONTROL METHOD FOR INFORMATION PROCESSING DEVICE

(71) Applicant: CYGAMES, INC., Tokyo (JP)

(72) Inventors: Daisuke Sato, Tokyo (JP); Yui Matsumoto, Tokyo (JP)

(73) Assignee: CYGAMES, INC., Tokyo (JP)

( * ) Notice: Subject to any disclaimer, the term of this patent is extended or adjusted under 35 U.S.C. 154(b) by 86 days.

(21) Appl. No.: 17/661,225

(22) Filed: Apr. 28, 2022

(65) Prior Publication Data

US 2022/0297012 A1    Sep. 22, 2022

Related U.S. Application Data

(63) Continuation of application No. PCT/JP2020/040873, filed on Oct. 30, 2020.

(30) Foreign Application Priority Data

Oct. 31, 2019 (JP) ................................. 2019-198992

(51) Int. Cl.
A63F 13/00 (2014.01)
A63F 13/69 (2014.01)
A63F 13/80 (2014.01)

(52) U.S. Cl.
CPC .............. *A63F 13/69* (2014.09); *A63F 13/80* (2014.09); *A63F 2300/609* (2013.01); *A63F 2300/80* (2013.01)

(58) Field of Classification Search
CPC ....... A63F 3/00075; A63F 3/822; A63F 3/807
See application file for complete search history.

(56) References Cited

U.S. PATENT DOCUMENTS

2003/0060248 A1* 3/2003 Yamashita ............. A63F 13/45
  463/1
2008/0227543 A1* 9/2008 Kawase ................. A63F 13/10
  463/31

(Continued)

FOREIGN PATENT DOCUMENTS

JP       4955829 B1    6/2012
JP       2015-39386 A  3/2015

(Continued)

OTHER PUBLICATIONS

International Search Report issued in PCT/JP2020/040873, mailed on Jan. 12, 2021 (3 pages).

(Continued)

*Primary Examiner* — David L Lewis
*Assistant Examiner* — Eric M Thomas
(74) *Attorney, Agent, or Firm* — Osha Bergman Watanabe & Burton LLP

(57) ABSTRACT

A deck constructed according to a deck recipe corresponding to each level of each CPU player is similar to a CPU player deck corresponding to the CPU player and the level. Thus, a player can understand how to use cards in the deck constructed according to the deck recipe corresponding to the CPU player and the level in the course of repeatedly playing battles against the CPU player at the level. Thus, in this embodiment, it becomes easier for the player to use decks constructed according to deck recipes corresponding to individual levels of individual CPU players in battles.

6 Claims, 18 Drawing Sheets

(56) References Cited

U.S. PATENT DOCUMENTS

| | | |
|---|---|---|
| 2015/0057085 A1 | 2/2015 | Tagawa et al. |
| 2016/0027260 A1* | 1/2016 | Pierce ................. G07F 17/3276 463/7 |
| 2019/0143217 A1 | 5/2019 | Yoneyama et al. |

FOREIGN PATENT DOCUMENTS

| | | |
|---|---|---|
| JP | 5941605 B1 | 6/2016 |
| JP | 2018-15542 A | 2/2018 |

OTHER PUBLICATIONS

Written Opinion of the International Searching Authority PCT/PCT/JP2020/040873, mailed on Jan. 12, 2021 (5 pages).

V Jump Books [game series], Gameboy color version; "Yu-Gi-Oh! DM4: Battle of Great Duelist"; Game Guide 1, Campaign conquering secret, 1st edition, Dec. 12, 2000 (7 pages).

V Jump Books [game series], Nintendo DS version; "YU-GI-OH! Duel monsters nightmare Troubadour"; 1st edition, Feb. 27, 2006 (3 pages).

* cited by examiner

MASTER LIST A

| CARD ID | CARD NAME |
|---|---|
| A000 | name0 |
| A001 | name1 |
| A002 | name2 |
| A003 | name3 |
| ... | ... |
| A077 | name77 |
| A078 | name78 |
| A079 | name79 |

⋮

MASTER LIST H

| CARD ID | CARD NAME |
|---|---|
| H000 | name350 |
| H001 | name351 |
| H002 | name352 |
| H003 | name353 |
| ... | ... |
| H077 | name637 |
| H078 | name638 |
| H079 | name639 |

SHARED MASTER LIST

| CARD ID | CARD NAME |
|---|---|
| I000 | name640 |
| I001 | name641 |
| I002 | name642 |
| I003 | name643 |
| ... | ... |
| I059 | name699 |
| I060 | name700 |
| I061 | name701 |

DEFAULT DECK H

| CARD NO | CARD ID |
|---|---|
| 00 | H000 |
| 01 | H001 |
| 02 | H002 |
| 03 | H002 |
| ... | ... |
| 37 | I017 |
| 38 | I018 |
| 39 | I019 |

⋮

DEFAULT DECK A

| CARD NO | CARD ID |
|---|---|
| 00 | A000 |
| 01 | A000 |
| 02 | A001 |
| 03 | A001 |
| ... | ... |
| 37 | I008 |
| 38 | I008 |
| 39 | I009 |

FIG. 7
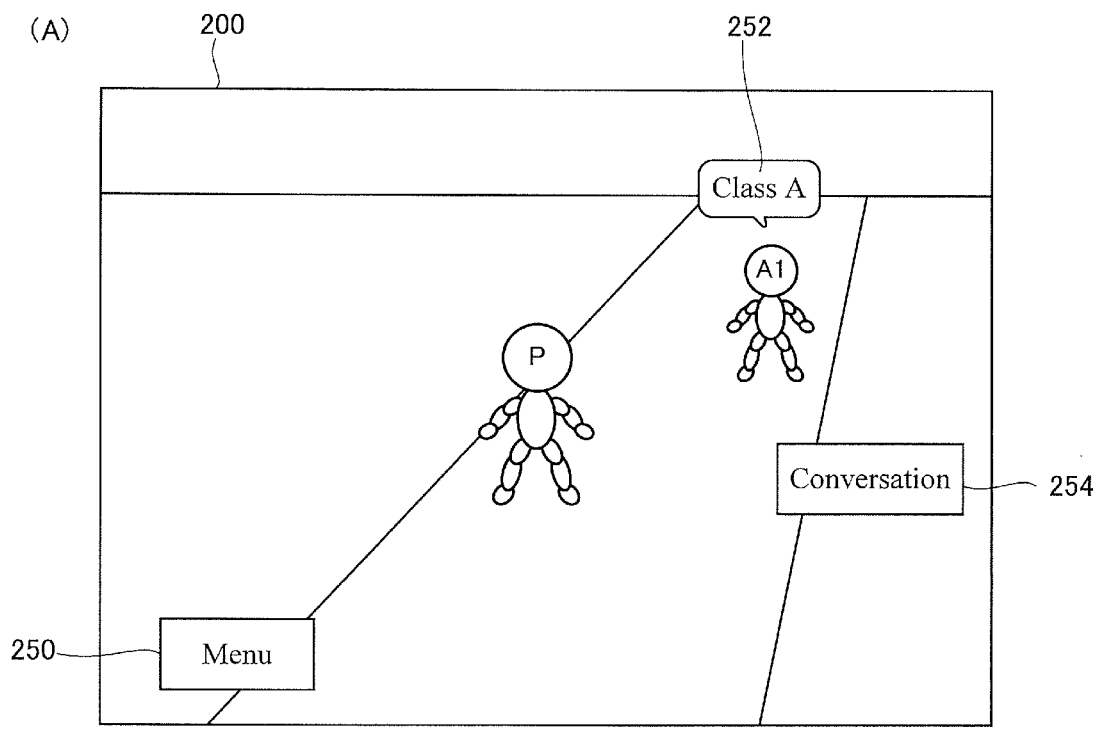
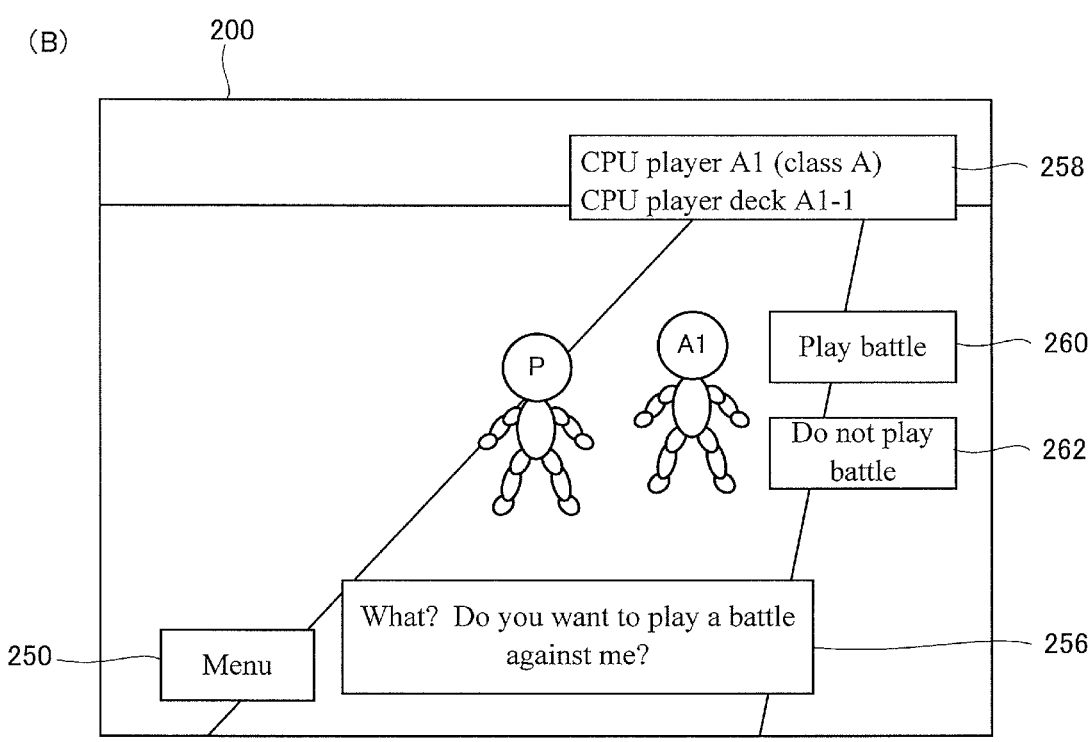

| CPU PLAYER | LEVEL | CPU PLAYER DECK | LOTTERY SUBJECT CARD GROUP | DECK RECIPE | MAIN CARD |
|---|---|---|---|---|---|
| CPU-A1 | LEVEL1 | CPU PLAYER DECK A1-1 | LOTTERY SUBJECT CARD GROUP A1-1 | DECK RECIPE A1-1 | A017 |
|  | LEVEL2 | CPU PLAYER DECK A1-2 | LOTTERY SUBJECT CARD GROUP A1-2 | DECK RECIPE A1-2 | A033 |
|  | LEVEL3 | CPU PLAYER DECK A1-3 | LOTTERY SUBJECT CARD GROUP A1-3 | DECK RECIPE A1-3 | A056 |
| CPU-A2 | LEVEL1 | CPU PLAYER DECK A2-1 | LOTTERY SUBJECT CARD GROUP A2-1 | DECK RECIPE A2-1 | A038 |
|  | LEVEL2 | CPU PLAYER DECK A2-2 | LOTTERY SUBJECT CARD GROUP A2-2 | DECK RECIPE A2-2 | A061 |
| CPU-A3 | LEVEL1 | CPU PLAYER DECK A3 | LOTTERY SUBJECT CARD GROUP A3 | DECK RECIPE A3 | A045 |
| CPU-A4 | LEVEL1 | CPU PLAYER DECK A4 | LOTTERY SUBJECT CARD GROUP A4 | DECK RECIPE A4 | A072 |
| CPU-B1 | LEVEL1 | CPU PLAYER DECK B1-1 | LOTTERY SUBJECT CARD GROUP B1-1 | DECK RECIPE B1-1 | B019 |
|  | LEVEL2 | CPU PLAYER DECK B1-2 | LOTTERY SUBJECT CARD GROUP B1-2 | DECK RECIPE B1-2 | B031 |
|  | LEVEL3 | CPU PLAYER DECK B1-3 | LOTTERY SUBJECT CARD GROUP B1-3 | DECK RECIPE B1-3 | B072 |

| CPU-H4 | LEVEL1 | CPU PLAYER DECK H4-1 | LOTTERY SUBJECT CARD GROUP H4-1 | DECK RECIPE H4-1 | H060 |
|---|---|---|---|---|---|
|  | LEVEL2 | CPU PLAYER DECK H4-2 | LOTTERY SUBJECT CARD GROUP H4-2 | DECK RECIPE H4-2 | H071 |

FIG. 8

FIG. 10
(A)
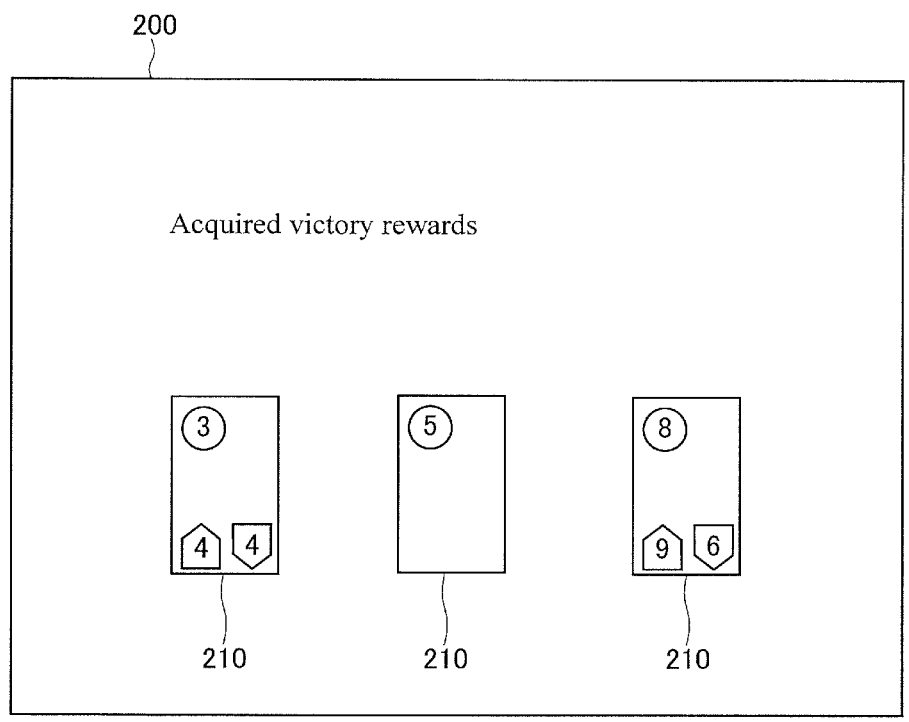
(B)
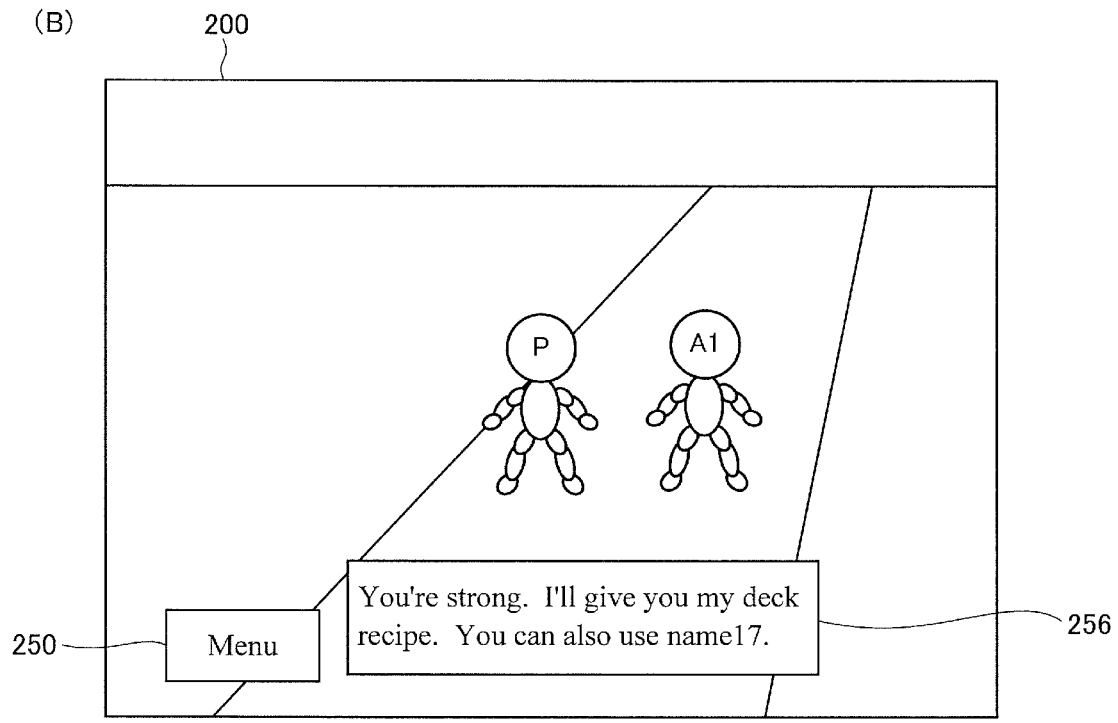

FIG. 11

CPU PLAYER DECK A1-1

| CARD NO | CARD ID |
|---|---|
| 00 | A000 |
| 01 | A000 |
| 02 | A000 |
| 03 | A001 |
| 04 | A001 |
| 05 | A001 |
| 06 | A003 |
| 07 | A006 |
| 08 | A006 |
| 09 | A008 |
| 10 | A008 |
| 11 | A008 |
| 12 | A009 |
| 13 | A010 |
| 14 | A010 |
| 15 | A010 |
| 16 | A014 |
| 17 | A015 |
| 18 | A017 |
| 19 | A018 |
| 20 | A018 |
| 21 | A018 |
| 22 | A020 |
| 23 | A020 |
| 24 | A022 |
| 25 | A022 |
| 26 | I000 |
| 27 | I000 |
| 28 | I000 |
| 29 | I001 |
| 30 | I003 |
| 31 | I003 |
| 32 | I006 |
| 33 | I011 |
| 34 | I011 |
| 35 | I015 |
| 36 | I015 |
| 37 | I015 |
| 38 | I016 |
| 39 | I016 |

DECK ACCORDING TO DECK RECIPE A1-1

| CARD NO | CARD ID | |
|---|---|---|
| 00 | A000 | |
| 01 | A000 | |
| 02 | A000 | |
| 03 | A001 | |
| 04 | A001 | |
| 05 | A002 | |
| 06 | A004 | |
| 07 | A006 | ★LOTTERY SUBJECT |
| 08 | A006 | |
| 09 | A008 | |
| 10 | A008 | |
| 11 | A009 | ★LOTTERY SUBJECT |
| 12 | A009 | |
| 13 | A010 | |
| 14 | A010 | |
| 15 | A010 | |
| 16 | A014 | ★LOTTERY SUBJECT |
| 17 | A019 | ★LOTTERY SUBJECT |
| 18 | A017 | ●MAIN CARD |
| 19 | A018 | ★LOTTERY SUBJECT |
| 20 | A018 | |
| 21 | A018 | |
| 22 | A020 | ★LOTTERY SUBJECT |
| 23 | A020 | |
| 24 | A022 | ★LOTTERY SUBJECT |
| 25 | A022 | |
| 26 | I000 | |
| 27 | I000 | |
| 28 | I000 | |
| 29 | I002 | |
| 30 | I003 | |
| 31 | I006 | ★LOTTERY SUBJECT |
| 32 | I006 | |
| 33 | I011 | ★LOTTERY SUBJECT |
| 34 | I011 | |
| 35 | I015 | ★LOTTERY SUBJECT |
| 36 | I015 | |
| 37 | I015 | |
| 38 | I016 | |
| 39 | I016 | |

FIG. 14

| | CARD PACK1 | | | | CARD PACK2 | CARD PACK3 | CARD PACK4 | | CARD PACK5 | |
|---|---|---|---|---|---|---|---|---|---|---|
| | CHAPTER1 | CHAPTER2 | CHAPTER3 | CHAPTER4 | CHAPTER5 | CHAPTER6 | CHAPTER7 | CHAPTER8 | CHAPTER9 | CHAPTER10 |
| CPU-A1 | LEVEL1·CPU PLAYER DECKA1-1 | | | | LEVEL2·A1-2 | | LEVEL3·CPU PLAYER DECKA1-3 | | | |
| CPU-A2 | NONE | | | | LEVEL1·A2-1 | | LEVEL2·CPU PLAYER DECKA2-2 | | | |
| CPU-A3 | NONE | | | | | | LEVEL1·CPU PLAYER DECKA3 | | | |
| CPU-A4 | NONE | | | | | | | | LEVEL1·CPU PLAYER DECKA4 | |
| CPU-B1 | LEVEL1·CPU PLAYER DECKB1-1 | | | | LEVEL2·CPU PLAYER DECKB1-2 | | LEVEL3·CPU PLAYER DECKB1-3 | | | |
| CPU-B2 | NONE | | | | LEVEL1·B2-1 | | LEVEL2·CPU PLAYER DECKB2-2 | | | |
| CPU-B3 | NONE | | | | | | LEVEL1·CPU PLAYER DECKB3 | | | |

⋮

| | CHAPTER1 | CHAPTER2 | CHAPTER3 | CHAPTER4 | CHAPTER5 | CHAPTER6 | CHAPTER7 | CHAPTER8 | CHAPTER9 | CHAPTER10 |
|---|---|---|---|---|---|---|---|---|---|---|
| CPU-H1 | LEVEL1·CPU PLAYER DECKH1-1 | | | | LEVEL2·CPU PLAYER DECKH1-2 | | LEVEL3·H1-3 | LEVEL4·CPU PLAYER DECKH1-4 | | |
| CPU-H2 | NONE | | | | LEVEL1·H2-1 | | LEVEL2·CPU PLAYER DECKH2-2 | | | |
| CPU-H3 | NONE | | | | | | LEVEL1·H3-1 | LEVEL2·CPU PLAYER DECKH3-2 | | |
| CPU-H4 | NONE | | | | | | LEVEL1·H4-1 | LEVEL2·CPU PLAYER DECKH4-2 | | |

INFORMATION STORAGE MEDIUM PROGRAM, INFORMATION PROCESSING DEVICE, AND CONTROL METHOD FOR INFORMATION PROCESSING DEVICE

This application is a continuation of International Patent Application No. PCT/JP2020/040873, having an international filing date of Oct. 30, 2020, which designated the United States, the entirety of which is incorporated herein by reference. Japanese Patent Application No. 2019-198992 filed on Oct. 31, 2019 is also incorporated herein by reference in its entirety.

BACKGROUND

The present invention relates to information storage mediums, information processing devices, and control methods for information processing devices.

There is a type of program that has been known heretofore, with which a player constructs a card group by combining a plurality of kinds of cards, and a battle-type card game is executed on the basis of cards selected by the player from the card group constructed by the player and cards selected by an opponent from a card group constructed by the opponent.

Furthermore, among programs of the type described above, there is a program with which card group data for identifying cards included in card groups is assigned to a player, and the player is allowed to construct a card group on the basis of the assigned card group data (Publication of Japanese Patent No. 5941605).

With such a program, it is the case that even if a player constructs a card group on the basis of assigned card group data, it is difficult to understand which cards are to be selected from the card group constructed on the basis of the card group data and how a battle is to be played.

SUMMARY

The present invention has been made in view of the situation described above, and it is an object thereof to provide a non-transitory computer-readable information storage medium storing a program, an information processing device, and a control method for an information processing device with which it becomes easy for a player to use a card group constructed on the basis of assigned card group data.

According to a first aspect of the invention, there is provided a non-transitory computer-readable information storage medium storing a program for setting one of a plurality of non-player characters as a non-player character of an opponent and executing a battle game on the basis of game media included in a game medium group used by the non-player character of the opponent and game media included in a game medium group used by a player, the program causing a computer to function as:
an identification-data assignment unit that assigns identification data to the player on the basis of a result of the battle game, the identification data identifying the content of a game medium group corresponding to the non-player character of the opponent; and
a game-medium assignment unit that assigns game media to the player on the basis of the result of the battle game, the game media being included in the game medium group corresponding to the non-player character of the opponent,
wherein at least some of the game media assigned to the player are included in the game medium group used by the non-player character of the opponent.

According to a second aspect of the invention, there is provided an information processing device for setting one of a plurality of non-player characters as a non-player character of an opponent and executing a battle game on the basis of game media included in a game medium group used by the non-player character of the opponent and game media included in a game medium group used by a player, the information processing device comprising:
an identification-data assignment unit that assigns identification data to the player on the basis of a result of the battle game, the identification data identifying the content of a game medium group corresponding to the non-player character of the opponent; and
a game-medium assignment unit that assigns game media to the player on the basis of the result of the battle game, the game media being included in the game medium group corresponding to the non-player character of the opponent,
wherein at least some of the game media assigned to the player are included in the game medium group used by the non-player character of the opponent.

According to a third aspect of the invention, there is provided a control method for an information processing device for setting one of a plurality of non-player characters as a non-player character of an opponent and executing a battle game on the basis of game media included in a game medium group used by the non-player character of the opponent and game media included in a game medium group used by a player, the control method comprising:
an identification-data assignment step of assigning identification data to the player on the basis of a result of the battle game, the identification data identifying the content of a game medium group corresponding to the non-player character of the opponent; and
a game-medium assignment step of assigning game media to the player on the basis of the result of the battle game, the game media being included in the game medium group corresponding to the non-player character of the opponent,
wherein at least some of the game media assigned to the player are included in the game medium group used by the non-player character of the opponent.

BRIEF DESCRIPTION OF THE DRAWINGS

FIG. 5 is a figure for explaining master lists in the embodiment of the present invention.

FIG. 6 is a figure for explaining default decks in the embodiment of the present invention.

FIG. 7 is a figure showing images displayed in the display area of the terminal device in the embodiment of the present invention.

FIG. 8 is a figure showing corresponding relationships among various kinds of data in the embodiment of the present invention.

FIG. 10 is a figure showing images displayed in the display area of the terminal device in the embodiment of the present invention.

FIG. 11 is a figure for explaining a deck according to a deck recipe in the embodiment of the present invention.

FIG. 14 is a figure for explaining card packs in the embodiment of the present invention.

Figure 1:
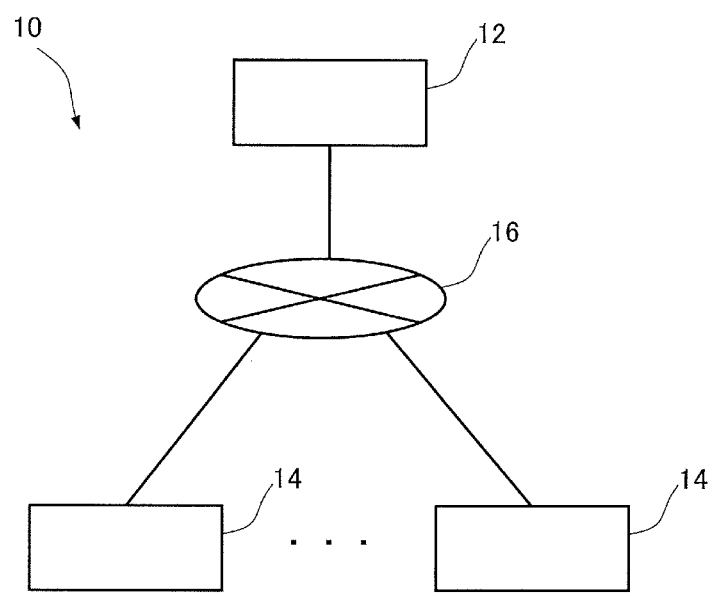
FIG. 1 is a schematic block diagram showing the configuration of an information processing system in an embodiment of the present invention.

DESCRIPTION OF EXEMPLARY EMBODIMENTS (1) According to one embodiment of the invention, there is provided a non-transitory computer-readable information storage medium storing a program for setting one of a plurality of non-player characters as a non-player character of an opponent and executing a battle game on the basis of game media included in a game medium group used by the non-player character of the opponent and game media included in a game medium group used by a player, the program causing a computer to function as: an identification-data assignment unit that assigns identification data to the player on the basis of a result of the battle game, the identification data identifying the content of a game medium group corresponding to the non-player character of the opponent; and a game-medium assignment unit that assigns game media to the player on the basis of the result of the battle game, the game media being included in the game medium group corresponding to the non-player character of the opponent, wherein at least some of the game media assigned to the player are included in the game medium group used by the non-player character of the opponent.

According to the present embodiment, since at least some of the game media assigned to the player are included in the game medium group used by the non-player character of the opponent, the player can understand how to use the game media assigned to the player through the battle game against the non-player character of the opponent.

(2) Furthermore, in the present embodiment, the game media assigned to the player may include: first specific game media included in the game medium group used by the non-player character of the opponent and also included in the game medium group corresponding to the non-player character of the opponent; and second specific game media not included in the game medium group used by the non-player character of the opponent and included in the game medium group corresponding to the non-player character of the opponent, and the second specific game media may be game media that are more advantageous than the first specific game media.

In this case, with the game media assigned to the player, it is possible to construct a game medium group that is more advantageous for the player than the game medium group used by the non-player character of the opponent.

(3) Furthermore, in the present embodiment, the program may further cause the computer to function as a game-medium-group processing unit for changing the game medium group used by the non-player character of the opponent on the basis of the status of proceeding of the game, and when the game medium group used by the non-player character of the opponent is changed, the identification-data assignment unit may assign identification data corresponding to the changed game medium group to the player on the basis of the result of the battle game, and the game-medium assignment unit may assign game media included in the changed game medium group to the player on the basis of the result of the battle game.

In this case, in accordance with the status of proceeding of the game, it is possible to change the game medium group used by the non-player character of the opponent, while also changing the identification data assigned to the player and the game media assigned to the player.

(4) Furthermore, according to another embodiment of the invention, there is provided an information processing device for setting one of a plurality of non-player characters as a non-player character of an opponent and executing a battle game on the basis of game media included in a game medium group used by the non-player character of the opponent and game media included in a game medium group used by a player, the information processing device including: an identification-data assignment unit that assigns identification data to the player on the basis of a result of the battle game, the identification data identifying the content of a game medium group corresponding to the non-player character of the opponent; and a game-medium assignment unit that assigns game media to the player on the basis of the result of the battle game, the game media being included in the game medium group corresponding to the non-player character of the opponent, wherein at least some of the game media assigned to the player are included in the game medium group used by the non-player character of the opponent.

(5) Furthermore, according to another embodiment of the invention, there is provided a control method for an information processing device for setting one of a plurality of non-player characters as a non-player character of an opponent and executing a battle game on the basis of game media included in a game medium group used by the non-player character of the opponent and game media included in a game medium group used by a player, the control method including: an identification-data assignment step of assigning identification data to the player on the basis of a result of the battle game, the identification data identifying the content of a game medium group corresponding to the non-player character of the opponent; and a game-medium assignment step of assigning game media to the player on the basis of the result of the battle game, the game media being included in the game medium group corresponding to the non-player character of the opponent, wherein at least some of the game media assigned to the player are included in the game medium group used by the non-player character of the opponent.

Embodiments of the present invention will be described below. Note that the embodiment described below does not unduly limit the content of the present invention recited in the claims. Furthermore, all the components described in the context of this embodiment are not necessarily necessary constituent elements of the present invention.

1. Configuration of Information Processing System

FIG. 1 is a schematic block diagram showing the configuration of an information processing system 10 in this embodiment. As shown in FIG. 1, in the information processing system 10, a server device 12 (information processing device) and a plurality of terminal devices 14 (information processing devices) are connected via a network 16, such as the Internet, a mobile phone network, a LAN, or a WAN, which constitutes what is called a client-server communication system. Furthermore, each of the plurality of terminal devices 14 mutually carries out communication with the server device 12 via the network 16 to send and receive various kinds of information, and mutually carries out communication with the other terminal devices 14 via the network 16 and the server device 12 to send and receive various kinds of information.

The server device 12 includes a processor such as a CPU, a main storage device such as a ROM or a RAM, an external storage device such as a hard disk, an input device such as a keyboard, a display device such as a liquid crystal display, a communication device, etc. Furthermore, at the server device 12, the CPU executes various kinds of processing according to programs stored in the main storage device or programs loaded from the external storage device into the main storage device, and receives information from the terminal devices 14 and sends information to the terminal devices 14 by means of the communication device.

Each of the terminal devices 14 may be various types of information processing devices, such as a smartphone, a tablet, a personal computer, a portable game machine, or an installed game machine installed at a commercial establishment or a household, which also include a processor such as a CPU, a main storage device such as a ROM or a RAM, an external storage device such as a flash memory or a hard disk, an input device such as a touchscreen, a keyboard, or a microphone, a display device such as a liquid crystal display or an organic EL display, a sound output device such as a speaker, a communication device, etc. Furthermore, also at each of the terminal devices 14, the CPU executes various kinds of processing according to programs stored in the main storage device or programs loaded from the external storage device into the main storage device, and receives information from the server device 12 and sends information to the server device 12 or the other terminal devices 14 by means of the communication device.

Figure 2:
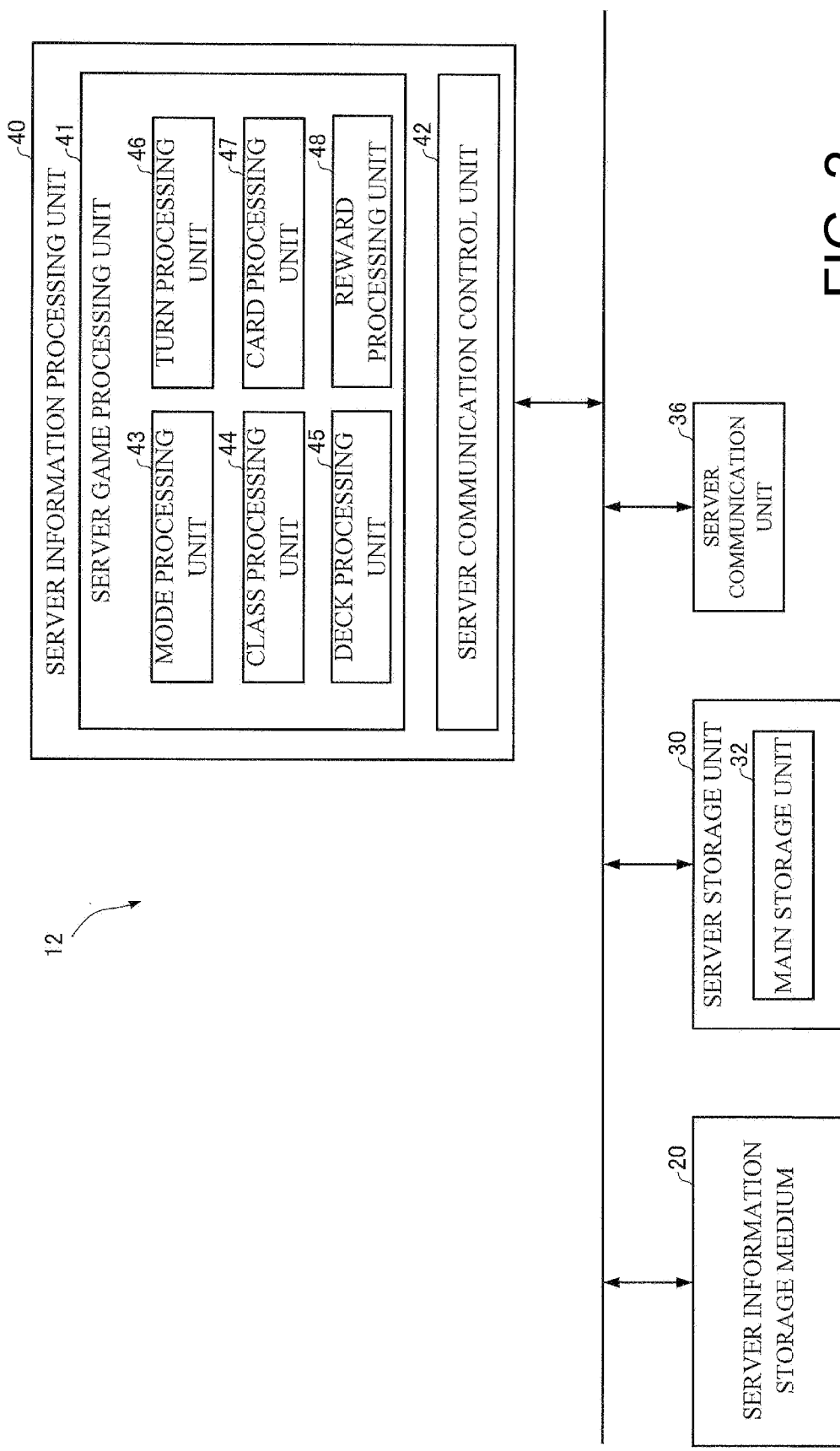
FIG. 2 is a functional block diagram showing the functions of a server device in the embodiment of the present invention.

FIG. 2 is a functional block diagram showing the functions of the server device 12 in this embodiment. As shown in FIG. 2, the server device 12 in this embodiment includes a server information storage medium 20, a server storage unit 30, a server communication unit 36, and a server information processing unit 40. Note that these constituent elements (individual units) in FIG. 2 may be partially omitted from the configuration.

The server information storage medium 20 stores programs, data, etc. for the server information processing unit 40 and the server communication unit 36 to execute various kinds of processing, and the function thereof can be realized by a flash memory, a hard disk, an optical disk (DVD or BD), or the like. That is, the server information storage medium 20 stores programs for causing a computer to function as the individual units in this embodiment (programs for causing a computer to execute processing by the individual units).

The server storage unit 30 serves as a work area for the server information processing unit 40 and the server communication unit 36, and the function thereof can be realized by a RAM (main memory), a VRAM (video memory), or the like. Specifically, the server storage unit 30 includes a main storage unit 32 into which programs and data are loaded from the server information storage medium 20.

The server communication unit 36 executes various kinds of control for carrying out communication with an external network (e.g., other server devices 12 and the terminal devices 14), and the function thereof can be realized by hardware such as various kinds of processors (a CPU (main processor), a DSP, etc.) or a communication ASIC, programs, or the like.

The server information processing unit 40, by using the main storage unit 32 as a work area, executes various kinds of processing, such as game processing, on the basis of received data received by the server communication unit 36, various kinds of programs and data in the server storage unit 30, etc., and the function thereof can be realized by hardware such as various kinds of processors or an ASIC, or programs.

Furthermore, the server information processing unit 40 includes a server game processing unit 41 and a server communication control unit 42. Note that these components may be partially omitted from the configuration.

The server game processing unit 41 executes processing such as the following on the basis of received data received by the server communication unit 36, the results of various kinds of processing executed by the server information processing unit 40, programs and data loaded into the main storage unit 32, etc.: processing for managing players on the basis of player IDs; processing for starting a game in the case where a game start condition is satisfied; processing for executing a selected game mode among a plurality of kinds of game modes; processing for proceeding with the game; processing for generating an event in the case where an event generation condition is satisfied; processing for computing a game result; and processing for terminating the game in the case where a game termination condition is satisfied.

Specifically, on the basis of player inputs, which are inputs by players at terminal devices 14, the server game processing unit 41 executes various kinds of processing for executing a card game in which a player at one terminal device 14 and a player at another terminal device 14, or a player at one terminal device 14 and a CPU player (non-player character) at the server device 12, select cards to be placed in the field from cards added to their individual hands (game media that can be selected by the players) by a lottery among cards (game media) included in their individual decks (game medium groups) and play a battle by using the cards placed in the field. Furthermore, the server game processing unit 41 includes a mode processing unit 43, a class processing unit 44, a deck processing unit 45, a turn processing unit 46, a card processing unit 47, and a reward processing unit 48. Note that these components may be partially omitted from the configuration.

The mode processing unit 43, upon accepting a player input with which a player selects one of a plurality of kinds of game modes, executes processing for setting the game mode selected by the player as the game mode for the player by associating the selected game mode with the player ID of the player.

In this embodiment, it is possible to select a multi-play game mode, in which the individual players at the plurality of terminal devices 14 play battles, or a solo-play game mode, in which the player at one of the terminal devices 14 plays a battle against a CPU player. In the case where the multi-play game mode is selected, processing for matching opponents is executed on the basis of player inputs individually given at the plurality of terminal devices 14. Meanwhile, in the case where the solo-play game mode is selected, processing for setting a CPU player of the opponent is executed on the basis of a prescribed algorithm or a player input.

The class processing unit 44, upon accepting a player input with which a player selects a class from a plurality of kinds of classes (types) including different kinds of cards available in battles, executes processing for setting the class selected by the player as the class for the player by associating the selected class with the player ID of the player. Furthermore, in the case where the opponent is a CPU player, the class processing unit 44 executes processing for setting a class for the CPU player on the basis of a prescribed algorithm. In this embodiment, it is possible to select eight kinds of classes, namely, class A to class H, and the leader character (type) that serves as a leader in a battle varies among the individual classes. Specifically, in this embodiment, there exist eight leader characters, namely, leader character A corresponding to class A to leader character H corresponding to class H, and the leader character corresponding to the class of a player or CPU player is set as the leader character for the player or CPU player.

The deck processing unit 45, upon accepting a player input with which a player selects a deck from a plurality of kinds of decks (types) including different kinds of cards, executes processing for setting the deck selected by the player as the deck that is used by the player by associating the selected deck with the player ID of the player. Although one deck includes 40 cards in this embodiment, the number of cards included in one deck may vary depending on the game mode.

In this embodiment, as default decks, which can be selected from the time when a player starts the game for the first time, eight kinds of default decks, namely, one kind of default deck A corresponding to class A to one kind of default deck H corresponding to class H, are stored in the server information storage medium 20. Furthermore, as constructed decks, which can be selected on condition that a player clears a mission or otherwise proceeds with the game or on condition that the player makes a payment in an in-game currency or a real currency, a plurality of kinds of constructed decks, namely, a plurality of kinds of constructed decks A corresponding to class A to a plurality of kinds of constructed decks H corresponding to class H, are stored in the server information storage medium 20.

Furthermore, the deck processing unit 45 executes processing for constructing a custom deck on the basis of a player input for combining cards that are possessed from the time when the player starts the game for the first time and cards that have come to be possessed by the player on condition that the player clears a mission or otherwise proceeds with the game or on condition that the player makes a payment in an in-game currency or a real currency.

Furthermore, the deck processing unit 45 executes processing for saving the constructed custom deck in the server information storage medium 20 in association with the player ID and setting the custom deck as a deck that can be selected by the player. Here, possessing a card or the like refers to a situation in which the card or the like has been set in a state in which the card or the like is available to a player at the server device 12 or one of the terminal devices 14, and is not limited to a situation in which information concerning the card or the like has been downloaded to the terminal device 14 owned by the player.

Furthermore, in the case where the opponent is a CPU player, the deck processing unit 45 executes processing for setting a deck that is used by the CPU player on the basis of a prescribed algorithm. In this embodiment, it is possible to play battles against a plurality of kinds of CPU players, namely, a plurality of kinds of CPU players A corresponding to class A to a plurality of kinds of CPU players H corresponding to class H, and a plurality of kinds of CPU player decks A that are used individually by the plurality of kinds of CPU players A to a plurality of kinds of CPU player decks H that are used individually by the plurality of kinds of CPU players H are stored in the server information storage medium 20. Furthermore, the deck processing unit 45 executes processing for setting the CPU player deck corresponding to the CPU player set as the opponent as the CPU player deck that is used by the CPU player of the opponent.

Furthermore, when the level of one of the CPU players is updated on the basis of the status of proceeding of the game, the deck processing unit 45 sets the updated level of the CPU player so that the player can select the updated level. Furthermore, the deck processing unit 45, upon accepting a player input for selecting a selectable level and determining that a battle is to be played against the CPU player at the level, the deck processing unit 45 executes processing for setting the CPU player deck corresponding to the level selected by the player as the CPU player deck that is used by the CPU player of the opponent.

The turn processing unit 46 executes processing for determining who plays first and who plays second between two players who play a battle or between a player and a CPU player who play a battle. Then, the turn processing unit 46 executes processing for making turns arrive alternately for the first player or CPU player and the second player or CPU player, with the first player or CPU player going first.

Furthermore, in the case of the multi-play game mode, the turn processing unit 46, upon accepting a player input for finishing a turn by a player whose turn has arrived or upon the expiration of 90 seconds, which is the time limit for one turn, finishes the one turn and makes a turn arrive for the other player.

Meanwhile, in the case of the solo-play game mode, in the state where a turn for the player has arrived, irrespective of the time limit for one turn, the turn processing unit 46, upon accepting a player input for finishing a turn by the player, finishes the one turn and makes a turn arrive for the CPU player, and in the state where a turn for the CPU player has arrived, the turn processing unit 46 finishes the one turn and makes a turn arrive for the player on the basis of a prescribed algorithm.

The card processing unit 47 executes processing for determining, by a lottery, a card to be added to the hand of a player whose turn has arrived from the cards remaining after excluding cards already set as the hand of the player from the cards included in the deck that is used by the player and for making a setting so as to add the determined card as the hand of the player.

Furthermore, in the case where the opponent is a CPU player, upon the arrival of a turn for the CPU player, the card processing unit 47 executes processing for determining, by a lottery, a card to be added to the hand of the CPU player from the cards remaining after excluding cards already set as the hand of the CPU player from the cards included in the deck that is used by the CPU player and for making a setting so as to add the determined card as the hand of the CPU player.

Specifically, the card processing unit 47 acquires one random number value from a random number generation unit that randomly generates a random number value for a lottery, and determines one card corresponding to the acquired one random number value with reference to a lottery table including, as items that are subject to the lottery, the cards remaining after excluding cards already set as the hand of the player or CPU player from the cards included in the deck that is used by the player or CPU player.

Here, the random number generation unit can be realized by a random number generator that generates hardware random numbers or a program that generates software random numbers. The software random numbers can be generated, for example, on the basis of the count value of an increment counter (a counter that cyclically counts numerical values within a prescribed count range). Note that, in this embodiment, "random number values" include not only values that are generated randomly in the mathematical sense but also values whose generation itself is systematic but that can substantially function as random numbers due to irregularity in the acquisition timings or the like thereof.

Specifically, in the case where one battle is started, for each of the two players who play the battle, or in the case where the opponent is a CPU player, for each of one player and the CPU player who play the battle, the card processing unit 47 determines, by a lottery, three (a prescribed number of) cards, which is a predefined number, as candidates for the initial hand of the player or CPU player from the cards included in the deck that is used by the player or CPU player.

Here, in this embodiment, a player is allowed, just once, to select cards to be replaced with other cards among the three cards serving as candidates for the initial hand of the player. Furthermore, upon accepting a player input with which the player selects not to replace any of the three cards serving as candidates for the initial hand of the player with another card, the card processing unit 47 sets the three cards serving as candidates for the initial hand of the player, as they are, as the initial hand of the player.

Meanwhile, upon accepting a player input with which the player selects cards to be replaced with other cards, the card processing unit 47 determines, by another lottery, the same number of cards as the number of cards selected for replacement from the cards remaining after excluding the three cards serving as candidates of the hand of the player from the cards included in the deck that is used by the player. Then, in the case where there exist cards determined by another lottery and cards not selected for replacement, the card processing unit 47 sets the cards serving as the candidates of the initial hand and not selected for replacement as the initial hand of the player.

Furthermore, in the case where the opponent is a CPU player, the card processing unit 47 determines, on the basis of a prescribed algorithm, whether none of the three cards serving as candidates for the initial hand of the CPU player are to be replaced with other cards or one or more of those cards are to be replaced with other cards. Then, when it is determined that none of the cards are to be replaced with other cards, the card processing unit 47 sets the three cards serving as candidates for the initial hand of the CPU player, as they are, as the initial hand of the CPU player.

Meanwhile, when one or more cards to be replaced with other cards are determined, the card processing unit 47 determines, by another lottery, the same number of cards as the number of cards selected for replacement from the cards remaining after excluding the three cards serving as candidates for the hand of the CPU player from the cards included in the deck that is used by the CPU player. Then, in the case where there exist cards determined by another lottery and cards not selected for replacement, the card processing unit 47 selects the cards serving as candidates for the initial hand and not selected for replacement as the initial hand of the CPU player.

Then, in the first turn of the first player or CPU player, the card processing unit 47 determines, by a lottery, one card to be added to the hand of the first player or CPU player from the cards remaining after excluding the cards set as the initial hand of the first player or CPU player.

Meanwhile, in the first turn of the second player or CPU player, the card processing unit 47 determines, by a lottery, two cards to be added to the hand of the second player or CPU player from the cards remaining after excluding cards already set as the hand of the second player or CPU player, i.e., the cards determined as the initial hand of the second player or CPU player, from the cards included in the deck that is used by the second player or CPU player.

Then, in the second and subsequent turns, for both the first player or CPU player and the second player or CPU player, the card processing unit 47 executes processing for determining, by a lottery, one card to be added to the hand.

That is, in this embodiment, since there is a factor that gives the first player or CPU player an advantage, just in the first turn, two cards are added to the hand of the second player or CPU player.

Note that, in this embodiment, the upper limit of the number of cards that can be set as the hand is set to nine. In the case where a turn for a player or CPU player arrives in a state where nine cards are set as the hand of the player or CPU player, processing for determining a card to be added to the hand of the player or CPU player is not executed, so that a new card is not added to the hand of the player or CPU player.

Here, in this embodiment, among the cards that are set as the hand, there exist cards that have set therefor costs as a parameter necessary for placing those cards in the field. Furthermore, in this embodiment, on each turn change, the turn processing unit 46 described earlier assigns play points, which are consumed when a card having a cost set therefor is placed in the field, to the player or CPU player whose turn has arrived.

In this embodiment, first, one point is assigned as the play points for the first turn of the first player or CPU player, then, one point is assigned as the play points for the first turn of the second player or CPU player, then, two points are assigned as the play points for the second turn of the first player or CPU player, and then, two points are assigned as the play points for the second turn of the second player or CPU player. In this manner, the same play points are assigned individually to the first player or CPU player and the second player or CPU player each time their individual turns arrive, and the play points that are assigned are increased by one point each time their individual turns arrive. Note that, in this embodiment, play points that are not consumed in one turn are not carried over to the next turn.

Furthermore, in this embodiment, the maximum value of the play points that are assigned for one turn is set to ten points. Thus, after ten points are assigned as the play points for the individual tenth turns of the first player or CPU player and the second player or CPU player, in their individual eleventh and subsequent turns, ten points are assigned as the play points for their individual eleventh and subsequent turns.

Furthermore, when play points have been assigned to a player or CPU player whose turn has arrived, the card processing unit 47 executes processing for setting, among the cards set as the hand of the player or CPU player whose turn has arrived, cards having costs set therefor less than or equal to the play points assigned in that turn in a play enabled state, in which it is allowed to place those cards in the field, while setting cards having costs set therefor greater than the play points assigned in that turn in a play disabled state, in which it is not allowed to place those cards in the field.

Furthermore, the card processing unit 47 executes processing for setting cards set as the hand of a player or CPU player whose turn has not arrived in the play disabled state, irrespective of the costs set therefor.

Furthermore, the card processing unit 47, upon accepting a player input for placing one of the cards set in the play enabled state in the field among the cards set as the hand of the player whose turn has arrived, executes processing for removing, from the hand of the player, the card for which the player input for placing the card in the field has been accepted and for adding the card as the layout of the player.

Furthermore, in the case where the opponent is a CPU player, the card processing unit 47 executes processing for determining, on the basis of a prescribed algorithm, which of the cards set in the play enabled state is to be placed in the field among the cards set as the hand of the CPU player whose turn has arrived, removing the determined card from the hand of the CPU player, and adding the card as the layout of the CPU player.

When a new card has been added as the layout of a player or CPU player, the card processing unit 47 executes processing for subtracting the value set as the cost of the newly added card from the value set as the play points of the player or CPU player.

Then, the card processing unit 47 executes processing for setting, among the cards set as the hand of the player or CPU player whose turn has arrived, cards having costs set therefor less than or equal to the play points after the subtraction in the play enabled state, while setting cards having costs set therefor greater than the play points after the subtraction in the play disabled state.

Therefore, in this embodiment, since play points that are assigned in the first turn are one point for both the first player or CPU player and the second player or CPU player, when one card having a cost of one is placed in the field, the play points become zero, so that it becomes no longer possible to further place any card having a cost set therefor in the field. Note, however, that since it is possible to place cards having no costs set therefor, i.e., cards with zero costs, in the field without consuming play points, it is possible to place such cards in the field even when the play points have become zero.

Note that, in this embodiment, the upper limit of the number of cards that can be set as the layout is set to five, so that in the state where five cards are set as the layout of a player or CPU player, a new card is not added as the layout of the player or CPU player.

Here, cards in this embodiment are classified into the following types: follower cards, with which, when set as the layout, it is possible to attack the leader character of the opponent; spell cards, which, when set as the layout, immediately invoke effects and are removed from the layout; and amulet cards, which, when set as the layout, invoke effects when predefined effect invocation conditions are satisfied and are removed from the layout when predefined removal conditions are satisfied.

Furthermore, in this embodiment, with a follower card set as the layout of a player or CPU player, it is possible to attack the leader character of the opponent and also to attack a follower card set as the layout of the opponent, but it is not possible to attack a spell card or an amulet card set as the layout of the opponent.

Furthermore, each follower card has set therefor attacking ability, physical energy, and cost as card parameters. Furthermore, each spell card or amulet card has a cost set therefor as a card parameter, while not having attacking ability or physical energy set therefor. Note that there exist cards having zero cost set therefor, i.e., having no cost set therefor, among follower cards, spell cards, and amulet cards.

Furthermore, for follower cards set as the layout of a player or CPU player whose turn has not arrived, the card processing unit 47 executes processing for setting those cards in an attack disabled state, in which it is not possible to attack therewith the leader character or a follower card of the opponent.

Furthermore, among the follower cards set as the layout of a player or CPU player whose turn has arrived, for follower cards added as the layout in the last and previous turns of the player or CPU player, the card processing unit 47 executes processing for setting those cards in an attack enabled state, in which it is possible to attack therewith the leader character or a follower card of the opponent, and for follower cards newly added as the layout in the current turn of the player or CPU player, the card processing unit 47 executes processing for setting those cards in the attack disabled state.

That is, in this embodiment, with a follower card added as the layout in the current turn, basically, it is not possible to attack the leader character or a follower card of the opponent in the current turn.

Furthermore, the card processing unit 47, upon accepting a player input for evolving one of the follower cards set as the layout of a player whose turn has arrived, executes evolution processing for evolving the follower card for which the player input for evolution has been accepted. Then, with the follower card subjected to the evolution processing, the attacking ability and physical energy are increased, or the card graphics change.

Furthermore, in the case where the opponent is a CPU player, the card processing unit 47 executes processing for determining, on the basis of a prescribed algorithm, which follower card is to be evolved among the cards set as the layout of the CPU player whose turn has arrived, and for evolving the determined follower card by increasing the attacking ability and physical energy of the follower card.

Here, in this embodiment, since there is a factor that gives the first player or CPU player an advantage, as described above, the permissible number of evolutions is set to two for the first player or CPU player, and the permissible number of evolutions is set to three for the second player or CPU player, where the number of permissible evolutions refers to the number of times follower cards can be evolved.

Furthermore, in this embodiment, as described earlier, for follower cards newly added as the layout in the current turn of a player or CPU player, the card processing unit 47 first sets those cards in the attack disabled state; however, in the case where processing for evolving one of those cards is executed in the current turn, the card processing unit 47 sets the follower card for which the evolution processing has been executed in the attack enabled state.

Furthermore, the card processing unit 47, upon accepting a player input for selecting, as the subject of the attack, a follower card set in the play enabled state among the follower cards set as the layout of the player whose turn has arrived, and for selecting one of the follower cards of the opponent as the target of the attack, executes processing for setting the follower card of the player, selected as the subject of the attack, as the subject of the attack and for setting the follower card of the opponent, selected as the target of the attack, as the target of the attack.

Furthermore, in the case where the opponent is a CPU player, the card processing unit 47 executes processing for setting, on the basis of a prescribed algorithm, a follower card set in the attack enabled state as the subject of the attack among the follower cards set as the layout of the CPU player whose turn has arrived, and for setting one of the follower cards of the opponent as the target of the attack.

Then, the card processing unit 47 executes processing for subtracting the value set as the attacking ability of the follower card of the player or CPU player, serving as the subject of the attack, from the value set as the physical energy of the follower card of the opponent, serving as the target of the attack, and also executes processing for subtracting the value set as the attacking ability of the follower card of the opponent, serving as the target of the attack, from the value set as the physical energy of the follower card of the player, serving as the subject of the attack.

Then, the card processing unit 47 executes processing for removing any follower card whose physical energy has become less than or equal to zero from the layout of the player or CPU player and for setting the follower card as a card in the graveyard of the player or CPU player.

Furthermore, the card processing unit 47, upon accepting a player input for selecting, as the subject of the attack, a follower card set in the play enabled state among the follower cards set as the layout of the player whose turn has arrived, and for selecting the leader character of the opponent as the target of the attack, executes processing for setting the follower card of the player, selected as the subject of the attack, as the subject of the attack and for setting the leader character the opponent, selected as the target of the attack, as the target of the attack.

Furthermore, in the case where the opponent is a CPU player, the card processing unit 47 executes processing for setting, on the basis of a prescribed algorithm, a follower card set in the attack enabled state as the subject of an attack among the follower cards set as the layout of the CPU player whose turn has arrived, and for setting the leader character of the opponent as the target of the attack.

Then, the card processing unit 47 executes processing for subtracting the value set as the attacking ability of the follower card of the player or CPU player, serving as the subject of the attack, from the value set as the physical energy of the leader character of the opponent, serving as the target of the attack, while not executing processing for subtracting the physical energy of the follower card of the player, serving as the subject of the attack, since the leader character has no attacking ability set therefor. Alternatively, the attacking ability of the leader character may be set to zero.

That is, in this embodiment, when follower cards are set as the subject of an attack and the target of the attack, subtraction is performed from the physical energy of both the follower card serving as the subject of the attack and the follower card serving as the target of the attack, whereas when a follower card is set as the subject of an attack and a leader character is set as the target of the attack, subtraction is unilaterally performed from the physical energy of the leader character, and the leader character is not allowed to serve as the subject of an attack.

Furthermore, in the case where the physical energy of the leader character of a player or CPU player has become less than or equal to zero, the card processing unit 47 determines that the player or CPU player has been defeated, while determining that the other player or CPU player has won. Furthermore, in the case where there exists no card that has not yet been set as the hand in the deck that is used by a player or CPU player whose turn has arrived, i.e., in the case where there is no more card that can be added to the hand, the card processing unit 47 determines that the player or CPU player has been defeated, while determining that the other player or CPU player has won.

Furthermore, the card processing unit 47 sets the follower card of the player or CPU player, set as the target of the attack, in the attack disabled state until the next turn for the player or CPU player arrives. That is, in this embodiment, with a follower card used to attack the leader character or a follower card of the opponent in the current turn, it is not allowed to attack the leader character or the follower card of the opponent again.

The reward processing unit 48 (specific-data assignment unit and game-medium assignment unit), on the basis of the results of battles, executes processing for assigning rewards to players by associating the rewards with the player IDs of the players, where the rewards refer to an in-game currency, items, cards, decks, deck recipes for constructing decks, etc. Note that the reward processing unit 48 may assign a reward to a player under a prescribed condition also in the case where a battle has resulted in a defeat for the player, as well as in the case where a battle has resulted in a victory for the player. Furthermore, the reward processing unit 48 may assign a reward to a player under a prescribed condition also in the case where a battle is terminated in the middle. Furthermore, assigning a card or the like to a player refers to setting the card or the like in a state in which the card or the like is available to the player at the server device 12 or one of the terminal devices 14, and is not limited to downloading information concerning the card or the like to the terminal device 14 owned by the player.

The server communication control unit 42 executes processing for causing the server communication unit 36 to carry out communication with other server devices 12 or the terminal devices 14 to send and receive various kinds of information. For example, the server communication control unit 42 causes the server communication unit 36 to send and receive information needed in processing for newly registering a player in the information processing system 10, information needed in processing for allowing a player to log into the information processing system 10, information needed in processing for setting a player or CPU player who cooperates with or plays a battle against a player who has logged in, information needed in processing for synchronizing the plurality of terminal devices 14, information needed in processing for executing a common game at the plurality of terminal devices 14, etc. Furthermore, the server communication control unit 42 also causes the server communication unit 36 to send and receive destination information indicating a destination of information, source information indicating a source of information, identification information identifying the information processing system 10 that has generated information, etc.

In particular, the server communication control unit 42 executes processing for receiving various kinds of player inputs acquired at the individual terminal devices 14 from the individual terminal devices 14 and for sending information concerning opponents and the results of various kinds of processing at the server game processing unit 41 to the individual terminal devices 14.

Figure 3:
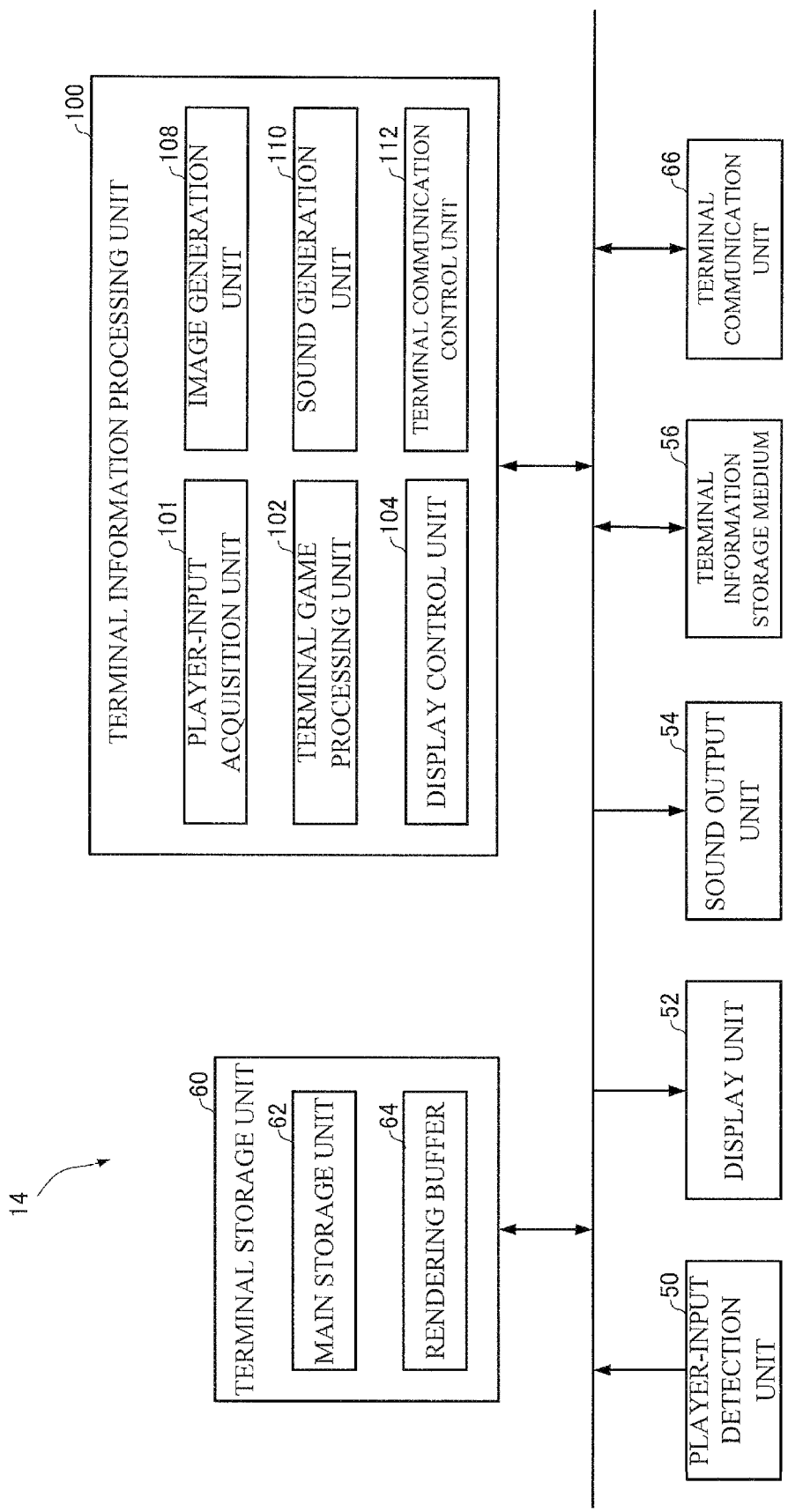
FIG. 3 is a functional block diagram showing the functions of a terminal device in the embodiment of the present invention.

FIG. 3 is a functional block diagram showing the functions of each of the terminal devices 14 in this embodiment. As shown in FIG. 3, each of the terminal devices 14 in this embodiment includes a player-input detection unit 50, a display unit 52, a sound output unit 54, a terminal information storage medium 56, a terminal storage unit 60, a terminal communication unit 66, and a terminal information processing unit 100. Note that the constituent elements (individual units) in FIG. 3 may be partially omitted from the configuration.

The player-input detection unit 50 detects inputs to the terminal device 14 by a player as player inputs, and the function thereof can be realized by a touch sensor, a switch, an optical sensor, a microphone, or the like.

The display unit 52 displays images on a display screen, and the function thereof can be realized by a liquid crystal display, an organic EL display, or the like.

The sound output unit 54 outputs sound, and the function thereof can be realized by a speaker, headphones, or the like.

The terminal information storage medium 56 stores programs, data, etc. for the terminal information processing unit 100 and the terminal communication unit 66 to execute various kinds of processing, and the function thereof can be realized by a flash memory, a hard disk an optical disk (DVD or BD), or the like. That is, the terminal information storage medium 56 stores programs for causing a computer to function as the individual units in this embodiment (programs for causing a computer to execute processing by the individual units).

The terminal storage unit 60 serves as a work area for the terminal information processing unit 100 and the terminal communication unit 66, and the function thereof can be realized by a RAM (main memory), a VRAM (video memory), etc. Specifically, the terminal storage unit 60 includes a main storage unit 62 into which programs and data are loaded from the terminal information storage medium 56 and a rendering buffer 64 in which an image to be displayed on the display unit 52 is rendered.

The terminal communication unit 66 executes various kinds of control for carrying out communication with an external network (e.g., the server device 12 or the other terminal devices 14), and the function thereof can be realized by hardware such as various kinds of processors or a communication ASIC, programs, or the like.

Note that the programs (data) for causing a computer to function as the individual units in this embodiment may be downloaded from the server device 12 to the terminal information storage medium 56 (or the main storage unit 62) of the terminal device 14 via the network 16 and the terminal communication unit 66, and such usage of the server device 12 can also be encompassed in the scope of the present invention.

The terminal information processing unit 100, by using the main storage unit 62 as a work area, executes various kinds of processing, such as game processing, image generation processing, and sound generation processing, on the basis of player inputs detected by the player-input detection unit 50, received data received by the terminal communication unit 66, various kinds of program and data in the terminal storage unit 60, etc., and the function thereof can be realized by hardware such as various kinds of processors (a CPU (main processor), a GPU (rendering processor), a DSP, etc.) or an ASIC, or programs.

Furthermore, the terminal information processing unit 100 includes a player-input acquisition unit 101, a terminal game processing unit 102, a display control unit 104, an image generation unit 108, a sound generation unit 110, and a terminal communication control unit 112. Note that these units may be partially omitted from the configuration.

The player-input acquisition unit 101 acquires player inputs, as kinds of inputs corresponding to situations, on the basis of player inputs detected by the player-input detection unit 50, programs and data loaded into the main storage unit 62, etc. For example, when a GUI, such as a button, is tapped in a state where the GUI is displayed, the player input is acquired as an input corresponding to the kind of GUI displayed. Specifically, the player-input acquisition unit 101 acquires various kinds of player inputs, such as player inputs for selecting a game mode, a class, and a deck, player inputs for matching opponents, player inputs for finishing turns, player inputs for placing cards in the field, and player inputs for attacking follower cards or leader characters of opponents.

The terminal game processing unit 102 executes processing for starting a game in the case where a game start condition is satisfied, processing for executing a selected game mode among a plurality of kinds of game modes, processing for proceeding with the game, processing for generating an event in the case where an event generation condition is satisfied, processing for computing a game result, processing for terminating the game in the case where a game termination condition is satisfied, etc. on the basis of player inputs acquired by the player-input acquisition unit 101, received data received by the terminal communication unit 66, the results of various kinds of processing executed by the terminal information processing unit 100, programs and data loaded into the main storage unit 62, etc.

The display control unit 104 controls the displaying of images that are displayed on the display unit 52. Specifically, the display control unit 104 executes display control concerning the displayed content, display modes, display timings, etc. of various objects and prerendering images (movie images) on the basis of player inputs acquired by the player-input acquisition unit 101, received data received by the terminal communication unit 66, the results of various kinds of processing executed by the terminal information processing unit 100, programs and data loaded into the main storage unit 62, etc.

In this embodiment, the terminal information storage medium 56 stores object data of various objects, such as card objects for displaying cards, character objects for displaying characters, non-character objects for displaying items other than characters, such as buildings, tools, vehicles, and terrains, background objects for displaying backgrounds, effect objects for displaying effects, and GUI (Graphic User Interface) objects for displaying GUIs such as buttons, as well as image data of various prerendering images. Furthermore, the display control unit 104 executes display control for objects and prerendering images in accordance with the kind of game mode being executed and the status of progress of the game, on the basis of object data and image data of prerendering images loaded into the main storage unit 62.

Specifically, for objects constituted of primitives representing the objects, such as polygons, free surfaces, or two-dimensional images, on the basis of object data loaded into the main storage unit 62, the display control unit 104 executes processing for disposing those objects in an object space, moving the objects, or causing those objects to take actions. Specifically, on the basis of player inputs acquired by the player-input acquisition unit 101, received data received by the terminal communication unit 66, the results of various kinds of processing executed by the terminal information processing unit 100, programs and data loaded into the main storage unit 62, etc., the display control unit 104, in every frame (e.g., 1/30 seconds), determines the positions and orientations (rotation angles) of objects in the object space, and disposes the objects at the determined positions in the determined orientations or causes a plurality of parts constituting the objects to individually take actions.

The image generation unit 108 executes processing for rendering a game image on the rendering buffer 64 on a per-frame basis on the basis of player inputs acquired by the player-input acquisition unit 101, received data received by the terminal communication unit 66, the results of various kinds of processing executed by the terminal information processing unit 100, in particular, the results of various kinds of processing executed by the display control unit 104, programs and data loaded into the main storage unit 62, etc., thereby generating a game image in which various objects and various prerendering images are displayed. Then, the image generation unit 108 outputs the generated game image to the display unit 52, on which the game image is displayed.

The sound generation unit 110 executes sound processing on the basis of the results of various kinds of processing executed by the terminal information processing unit 100, thereby generating game sound such as BGM, sound effects, or voice, and outputs the game sound to the sound output unit 54.

The terminal communication control unit 112 executes processing for causing the terminal communication unit 66 to carry out communication with the server device 12 or the other terminal devices 14 to send and receive various kinds of information. For example, the terminal communication control unit 112 causes the terminal communication unit 66 to send and receive information needed in processing for newly registering a player in the information processing system 10, information needed in processing for allowing a player to log into the information processing system 10, information needed in processing for setting another player who cooperates with or plays a battle against a player who has logged in, information needed in processing for synchronizing the plurality of terminal devices 14, information needed in processing for executing a common game at the plurality of terminal devices 14, etc. Furthermore, the terminal communication control unit 112 also causes the terminal communication unit 66 to send and receive destination information indicating a destination of information, source information indicating a source of information, identification information identifying the information processing system 10 that has generated information, etc.

In particular, the terminal communication control unit 112 executes processing for receiving, from the server device 12, information concerning the opponent and the results of various kinds of processing by the server game processing unit 41, and for sending, to the server device 12, information concerning the player at the terminal device 14 and player inputs acquired by the player-input acquisition unit 101.

Note that the server device 12 may be provided with the following functions of the terminal device 14: the function of the terminal information storage medium 56 in entirety or in part; the function of the terminal storage unit 60 in entirety or in part; the function of the terminal game processing unit 102 in entirety or in part; the function of the display control unit 104 in entirety or in part, or the function of the image generation unit 108 in part. Also note that the terminal device 14 may be provided with the following functions of the server device 12: the function of the server information storage medium 20 in entirety or in part; the function of the server storage unit 30 in entirety or in part; or the function of the server game processing unit 41 in entirety or in part.

2. Control Method in the Embodiment

The following describes a control method in the embodiment in detail in the context of an example in the case where a game program in this embodiment is applied to a game app for a smartphone (the terminal device 14).

Figure 4:
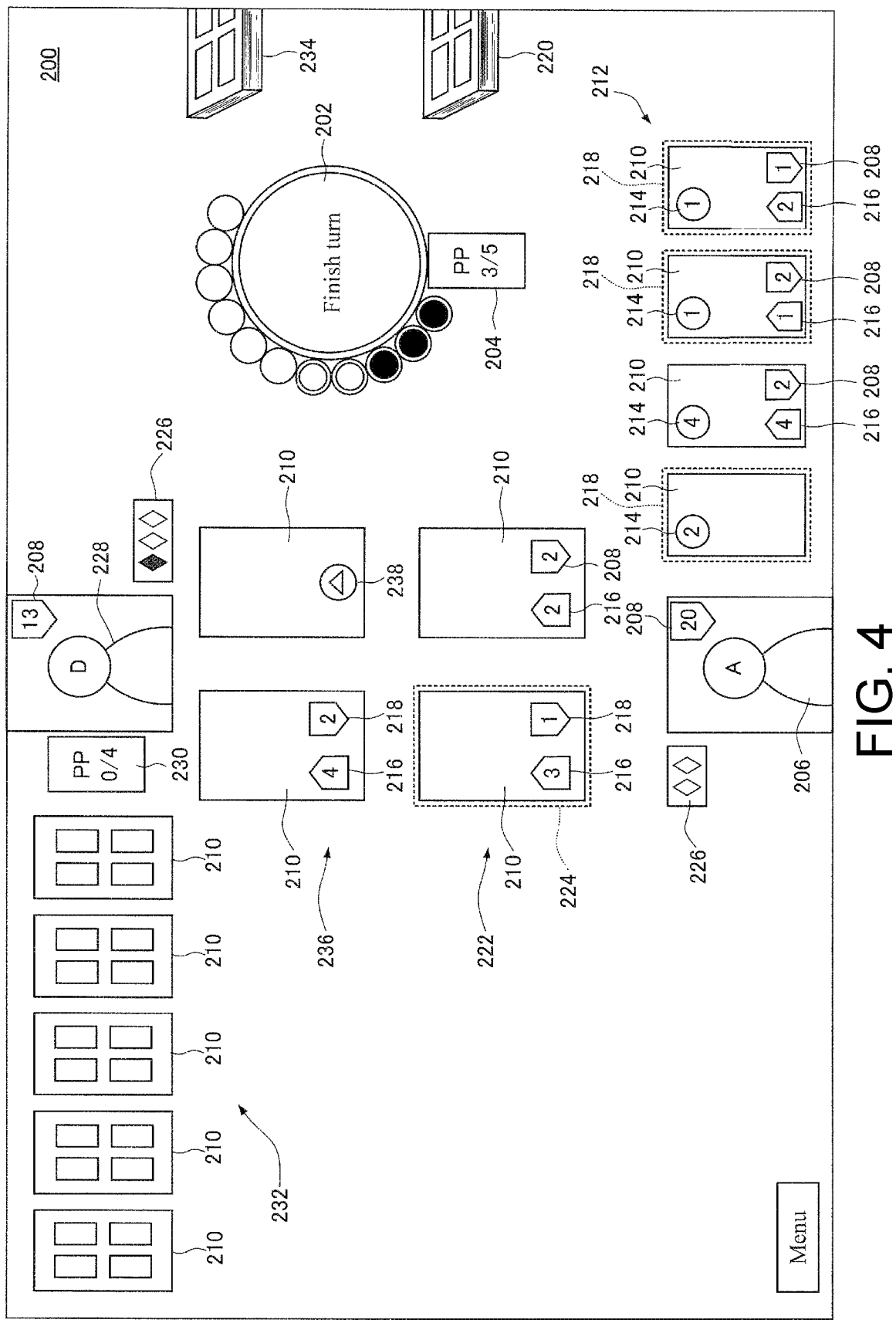
FIG. 4 is a figure showing an image displayed in a display area of the terminal device in the embodiment of the present invention.

FIG. 4 shows an example of game images in a card game, displayed in a display area 200 of a touchscreen display of the smartphone by the game program in this embodiment. In this embodiment, as shown in FIG. 4, in a middle right part of the display area 200, a turn finish button 202 for finishing a turn for the player at the local terminal is displayed. When the turn finish button 202 is tapped, the turn for the player at the local terminal is finished, and a turn for the opponent is started.

Furthermore, under the turn finish button 202, a local-terminal PP indication 204 indicating the play points (PP) of the player at the local terminal is displayed. The local-terminal PP indication 204 indicates the play points at the start of a turn and the currently remaining play points of the player at the local terminal. In the example in FIG. 4, the player at the local terminal is playing a turn, and the local-terminal PP indication 204 indicates that the play points at the start of the turn are five points and that the currently remaining play points are three points.

Furthermore, in a center lower part of the display area 200, a local-terminal leader image 206 indicating the leader character of the player at the local terminal is displayed, and in an upper right part of the local-terminal leader image 206, a physical energy indication 208 indicating the physical energy of the leader character of the player at the local terminal is displayed. In the example in FIG. 4, since class A is set as the class of the player at the local terminal, leader character A corresponding to class A is displayed as the local-terminal leader image 206.

Furthermore, on the right side of the local-terminal leader image 206, a local-terminal hand area 212 is provided, in which card images 210 corresponding to the cards set as the hand of the player at the local terminal are displayed. In the local-terminal hand area 212, it is possible to display a maximum of nine card images 210. In the example in FIG. 4, four card images 210 are displayed in the local-terminal hand area 212.

Furthermore, for each of the card images 210 displayed in the local-terminal hand area 212, although not shown, a cost indication 214 indicating the cost of the card, an attacking ability indication 216 indicating the attacking ability of the card, or a physical energy indication 208 indicating the physical energy of the card, as well as the name and graphics of the card, are displayed. In the example in FIG. 4, of the four card images 210 displayed in the local-terminal hand area 212, the first card image 210 from the left is a card image 210 for a spell card, and a cost indication 214 is displayed, but an attacking ability indication 216 and a physical energy indication 208 are not displayed. Furthermore, the second to fourth card images 210 from the left are card images 210 for follower cards, and cost indications 214, attacking ability indications 216, and physical energy indications 208 are displayed.

Furthermore, in the example in FIG. 4, since the currently remaining play points of the player at the local terminal are three points, as described above, of the four card images 210 displayed in the local-terminal hand area 212, the first, third, and fourth card images 210 from the left, whose cost indications 214 indicate points less than or equal to three points, include play enabled indications 218, which indicate that the cards are in the play enabled state, but the second card image 210 from the left, whose cost indication 214 indicates points greater than or equal to four points, does not include a play enabled indication 218.

Furthermore, on the upper left side of the local-terminal hand area 212, a local-terminal deck image 220 indicating the deck that is used by the player at the local terminal is displayed. In the case where a card is added to the hand of the player at the local terminal, a card image 210 is displayed so as to move from the local-terminal deck image 220 to the local-terminal hand area 212.

Furthermore, on the upper left side of the local-terminal hand area 212, a local-terminal layout area 222 is provided, in which card images 210 corresponding to the cards set as the layout of the player at the local terminal are displayed. In the local-terminal layout area 222, it is possible to display a maximum of five card images 210. In the example in FIG. 4, two card images 210 are displayed in the local-terminal layout area 222.

Furthermore, in the card images 210 displayed in the local-terminal layout area 222, although not shown, in the case of a follower card, an attacking ability indication 216 and a physical energy indication 208, as well as the name and graphics of the card, are displayed, but a cost indication 214 is not displayed since the cost has already been consumed as a result of being placed in the field from the hand. In the example in FIG. 4, each of the two card images 210 displayed in the local-terminal layout area 222 is a card image 210 for a follower card, and thus an attacking ability indication 216 and a physical energy indication 208 are displayed.

Furthermore, in the example in FIG. 4, of the two card images 210 displayed in the local-terminal layout area 222, the left card image 210 is a card image 210 corresponding to a follower card added as the layout in the last turn for the player at the local terminal, and thus an attack enabled indication 224 indicating that the card is in the attack enabled state is displayed. Meanwhile, the right card image 210 is a card image 210 corresponding to a follower card added as the layout in the current turn for the player at the local terminal, and thus the attack enabled indication 224 is not displayed.

Furthermore, on the left side of the local-terminal leader image 206, a permissible evolution number indication 226 indicating the permissible number of evolutions for the player at the local terminal is displayed. In the example in FIG. 4, since the player at the local terminal is the first player, the permissible evolution number indication 226 indicates that the initial value of the permissible number of evolutions for the player at the local terminal is two and that the currently remaining permissible number of evolutions is two.

Furthermore, in an upper center part of the display area 200, an opponent leader image 228 indicating the leader character of the opponent is displayed, and in an upper right part of the opponent leader image 228, a physical energy indication 208 indicating the physical energy of the leader character of the opponent is displayed. In the example in FIG. 4, since class D is set as the class of the opponent, leader character D corresponding to class D is displayed as the opponent leader image 228.

Furthermore, on the left side of the opponent leader image 228, an opponent PP indication 230 indicating the play points of the opponent is displayed, and the opponent PP indication 230 indicates the play points at the start of a turn for the opponent and the currently remaining play points. In the example in FIG. 4, the player at the local terminal is playing a turn, and it is indicated that the play points at the start of the turn for the opponent immediately preceding the turn for the player at the local terminal are four points and that the currently remaining play points are zero points.

Furthermore, on the left side of the opponent PP indication 230, an opponent hand area 232 is provided, in which card images 210 corresponding to the cards set as the hand of the opponent are displayed. In the opponent hand area 232, it is possible to display a maximum of nine card images 210. In the example in FIG. 4, five card images 210 are displayed in the opponent hand area 232.

Furthermore, in each of the card images 210 displayed in the opponent hand area 232, the graphics of the bottom face of the card are displayed, and the name, graphics, cost indication 214, attacking ability indication 216, or physical energy indication 208 of the card are not displayed. That is, the player at the local terminal is allowed to recognize the number of cards set as the hand of the opponent on the basis of the card images 210 displayed in the opponent hand area 232, but is not allowed to recognize the content of the card set as the hand of the opponent.

Furthermore, on the upper side of the local-terminal deck image 220 displayed at the right end of the display area 200, described above, an opponent deck image 234 indicating the deck of the opponent is displayed. In the case where a card is added to the hand of the opponent, a card image 210 is displayed so as to move from the opponent deck image 234 to the opponent hand area 232.

Furthermore, on the lower side of the opponent leader image 228, i.e., on the upper side of the local-terminal layout area 222, an opponent layout area 236 is provided, in which card images 210 corresponding to the cards set as the layout of the opponent are displayed. It is possible to display a maximum of five card images 210 in the opponent layout area 236. In the example in FIG. 4, two card images 210 are displayed in the opponent layout area 236.

Furthermore, in each of the card images 210 displayed in the opponent layout area 236, although not shown, in the case of a follower card, an attacking ability indication 216 and a physical energy indication 208, as well as the name and graphics of the card, are displayed, but a cost indication 214 is not displayed since the cost has already been consumed as a result of the card being placed in the field from the hand. In the example in FIG. 4, of the two card images 210 displayed in the opponent layout area 236, the left card image 210 is a card image 210 for a follower card, and thus an attacking ability indication 216 and a physical energy indication 208 are displayed. Meanwhile, the right card image 210 is a card image 210 for an amulet card. Since an amulet card has no attacking ability or physical energy set therefor, in the card image 210 corresponding to an amulet card, an attacking ability indication 216 or a physical energy indication 208 is not displayed, but an effect indication 238 indicating the effect set for the amulet card is displayed.

Furthermore, on the right side of the opponent leader image 228, a permissible evolution number indication 226 indicating the permissible number of evolutions for the opponent is displayed. In the example in FIG. 4, since the opponent is the second player, the permissible evolution number indication 226 indicates that the initial value of the permissible number of evolutions for the opponent is three and that the currently remaining permissible number of evolutions is two.

Furthermore, in this embodiment, in a turn for the player at the local terminal, with the card images 210 for which play enabled indications 218 are displayed in the local-terminal hand area 212, when the player at the local terminal drags and drops one of those card images 210 in the local-terminal layout area 222 while touching that card image 210, this operation is acquired as a player input for placing the card corresponding to the dropped card image 210 in the field. Then, the dropped card image 210 is displayed in the local-terminal layout area 222 with the cost indication 214 erased, and the result of subtracting the cost of the card corresponding to the dropped card image 210 from the currently remaining play points in the local-terminal PP indication 204 is displayed.

Furthermore, in a turn for the player at the local terminal, when the player at the local terminal performs a drag from one of the card images 210 for follower cards, for which attack enabled indications 224 are displayed in the local-terminal layout area 222, to one of the card images 210 for follower cards, displayed in the opponent layout area 236, this operation is acquired as a player input for selecting the card image 210 for the follower card at the start point of the drag as the subject of an attack and for selecting the card image 210 for the follower card at the end point of the drag as the target of the attack. Then, in the card image 210 for the follower card of the player at the local terminal, serving as the subject of the attack, and the card image 210 for the follower card of the opponent, serving as the target of the attack, effect images indicating attacks on each other are displayed, and the results of performing subtraction from the physical energy indication 208 of the card image 210 for the follower card of the player at the local terminal, serving as the subject of the attack, and the physical energy indication 208 of the card image 210 for the follower card of the opponent, serving as the target of the attack, are displayed. Furthermore, the card images 210 for follower cards whose physical energy indications 208 have come to indicate values less than or equal to zero are deleted from the local-terminal layout area 222 or the opponent layout area 236.

Furthermore, in a turn for the player at the local terminal, when the player at the local terminal performs a drag from one of the card images 210 for follower cards, for which attack enabled indications 224 are displayed in the local-terminal layout area 222, to the opponent leader image 228, this operation is acquired as a player input for selecting the card image 210 for the follower card at the start point of the drag as the subject of an attack and for selecting the opponent leader image 228 at the end point of the drag as the target of the attack. Then, an effect image indicating being attacked is displayed in the opponent leader image 228 serving as the target of the attack, and the result of performing subtraction from the physical energy indication 208 of the opponent leader image 228 serving as the target of the attack is displayed. Furthermore, when the physical energy indication 208 of the opponent leader image 228 comes to indicate a value less than or equal to zero, an indication indicating a victory for the player at the local terminal is displayed.

Furthermore, in this embodiment, in a turn for the opponent, each time one card is added as the layout of the opponent, one card image 210 is displayed so as to move from the opponent hand area 232 to the opponent layout area 236. Then, the card image 210 corresponding to the card added as the layout of the opponent is displayed in the opponent layout area 236 with the cost indication 214 erased, and the result of subtracting the cost of the card displayed in the opponent layout area 236 from the currently remaining play points in the opponent PP indication 230 is displayed.

Furthermore, in a turn for the opponent, of the card images 210 displayed in the opponent layout area 236, attack enabled indications 224 are displayed in the card images 210 corresponding to follower cards set in the attack enabled state.

Furthermore, in a turn for the opponent, when one of the follower cards set in the attack enabled state among the follower cards set as the hand of the opponent is set as the subject of an attack and one of the follower cards of the player at the local terminal is set as the target of the attack, in the card image 210 for the follower card of the opponent, serving as the subject of the attack, and the card image 210 for the follower card of the player at the local terminal, serving as the target of the attack, effect images indicating attacks on each other are displayed, the results of performing subtraction from the physical energy indication 208 of the card image 210 for the follower card of the opponent, serving as the subject of the attack, and the physical energy indication 208 of the card image 210 for the follower card of the player at the local terminal, serving as the target of the attack, are displayed. Furthermore, the card images 210 for follower cards whose physical energy indications 208 have come to indicate values less than or equal to zero are deleted from the local-terminal layout area 222 or the opponent layout area 236.

Furthermore, in a turn for the opponent, when one of the follower cards set in the attack enabled state among the follower cards set as the layout of the opponent is set as the subject of an attack and the local-terminal leader character is set as the target of the attack, an effect image indicating being attacked is displayed in the local-terminal leader image 206 serving as the target of the attack, and the result of performing subtraction from the physical energy indication 208 of the local-terminal leader image 206 serving as the target of the attack is displayed. Furthermore, when the physical energy indication 208 of the local-terminal leader image 206 comes to indicate a value less than or equal to zero, an indication indicating a defeat for the player at the local terminal is displayed.

FIG. 5 shows master lists serving as lists of all the cards in the card game in this embodiment. The master lists in this embodiment are stored in the server information storage medium 20. As shown in FIG. 5, the master lists include eight kinds of per-class master lists, namely, master list A corresponding to class A to master list H corresponding to class H, as well as one kind of shared master list corresponding to all the eight kinds of classes from class A to class H.

Each of the eight kinds of per-class master lists is an exhaustive list of cards that can be included in a deck in the case where the class of a player or CPU player is the corresponding class: for example, master list A is an exhaustive list of cards for class A, which can be included in the deck in the case where the class of the player or CPU player is class A; master list B is an exhaustive list of cards for class B, which can be included in the deck in the case where the class of the player or CPU player is class B; . . . (snip) . . . ; and master list H is an exhaustive list of cards for class H, which can be included in the deck in the case where the class of the player or CPU player is class H.

Specifically, in each of the eight kinds of per-class master lists, various kinds of card information are associated with each of the card IDs of 80 kinds of cards for each of the classes: for example, in master list A, various kinds of card information, such as a card name, a card classification, a cost, an attacking ability, a physical energy, an effect, an effect generation condition, a removal condition, and a rarity, are associated with each of the card IDs of the 80 kinds of cards for class A with card IDs from A000 to A079; in master list B, various kinds of card information are associated with each of the card IDs of the 80 kinds of cards for class B with card IDs from B000 to B079; . . . (snip) . . . ; and in master list H, various kinds of card information are associated with each of the card IDs of the 80 kinds of cards for class H with card IDs from H000 to H079.

Furthermore, the shared master list is an exhaustive list of cards shared among the classes, which can be included in a deck irrespective of the class of a player or CPU player. Specifically, in the shared master list, various kinds of card information are associated with each of the card IDs of the 62 kinds of cards with card IDs from I000 to I061, shared among the classes.

Note that, in this embodiment, each of the eight kinds of per-class master list and the one kind of shared master list includes follower cards, spell cards, and amulet cards.

FIG. 6 shows eight kinds of default decks, namely, default deck A corresponding to class A to default deck H corresponding to class H, described above, stored in the server information storage medium 20.

As shown in FIG. 6, each of default deck A to default deck H includes 40 cards with card number 00 to card number 39. Specifically, default deck A includes 40 cards in total, including a plurality of cards for class A and a plurality of card shared among classes, such as two cards with card ID A000, two cards with card ID A001, . . . (snip) . . . , two cards with card ID I008, and one card with card ID I009. Furthermore, default deck H includes 40 cards in total, including a plurality of cards for class H and a plurality of cards shared among classes, such as one card with card ID H000, one card with card ID H001, two cards with card ID H002, . . . (snip) . . . , one card with card ID I017, one card with card ID I018, and one card with card ID I019. That is, each of the eight kinds of default decks includes 40 cards in total, including a plurality of cards specific to a class and a plurality of cards shared among classes.

Furthermore, in this embodiment, although not shown, the server information storage medium 20 stores a plurality of kinds of constructed decks, from a plurality of kinds of constructed decks A corresponding to class A to a plurality of kinds of constructed decks H corresponding to class H, described above.

Furthermore, each of the plurality of kinds of constructed decks is a constructed deck that can be used in the case where the class of a player or CPU player is the corresponding class: for example, each of the plurality of kinds of constructed decks A is a constructed deck that can be used in the case where the class of the player or CPU player is class A; each of the plurality of kinds of constructed decks B is a constructed deck that can be used in the case where the class of the player or CPU player is class B; . . . (snip) . . . ; and each of the plurality of kinds of constructed decks H is a default deck that can be used in the case where the class of the player or CPU player is class H.

Furthermore, similarly to each of the eight kinds of default decks, each of the plurality of kinds of constructed decks includes 40 cards in total, including a plurality of class-specific cards and a plurality of cards shared among classes: for example, each of the plurality of kinds of constructed decks A includes 40 cards in total, including a plurality of cards for class A and a plurality of cards shared among classes; each of the plurality of kinds of constructed decks B includes 40 cards in total, including a plurality of cards for class B and a plurality of cards shared among classes; . . . (snip) . . . ; and each of the plurality of kinds of constructed decks H includes 40 cards in total, including a plurality of cards for class H and a plurality of cards shared among classes.

Here, each of the eight kinds of default decks in this embodiment is constructed such that the default deck includes few cards with high attacking ability or physical energy, few cards with advantageous effects, effect generation conditions, and removal conditions, or few cards with high rarity. That is, each of the eight kinds of default decks is a deck that can be selected from the time when a player starts the game for the first time, and is thus constructed such that the degree of giving the player an advantage is low.

Meanwhile, each of the plurality of kinds of constructed decks is constructed such that, depending on the kind of constructed deck, the constructed deck includes many cards with high attacking ability or physical energy, many cards with advantageous effects, effect generation conditions, and removal conditions, or many cards with high rarity. That is, the plurality of kinds of constructed decks individually have different conditions for allowing selection by a player, and thus are constructed to have different degrees of giving the player an advantage in accordance with the conditions for allowing selection by the player.

Furthermore, although not shown, the server information storage medium 20 can also store the custom decks described earlier, and each of the custom decks is also constructed as a custom deck corresponding to one of the eight kinds of classes from class A to class H. Specifically, in this embodiment, in the case where a player constructs a custom deck, first, a player input is accepted, with which the player selects one of the eight kinds of classes from class A to class H. Then, of the cards possessed by the player, the player combines cards for the class corresponding to the class selected by the player and cards shared among classes such that the total number becomes 40, thereby constructing a custom deck.

Furthermore, in this embodiment, although not shown, the server information storage medium 20 stores a plurality of kinds of CPU player decks, namely, a plurality of kinds of CPU player decks A that are individually used by the above-described plurality of kinds of CPU players A corresponding to class A to a plurality of kinds of CPU player decks H that are individually used by the above-described plurality of kinds of CPU players H corresponding to class H.

Furthermore, each of the plurality of kinds of CPU player decks includes 40 cards in total, including a plurality of class-specific cards and a plurality of cards shared among classes: for example, each of the plurality of kinds of CPU player decks A includes 40 cards in total, including a plurality of cards for class A and a plurality of cards shared among classes; each of the plurality of kinds of CPU player decks B includes 40 cards in total, including a plurality of cards for class B and a plurality of cards shared among classes; . . . (snip) . . . ; and each of the plurality of kinds of CPU player decks H includes 40 cards in total, including a plurality of cards for class H and a plurality of cards shared among classes.

As described above, in this embodiment, default decks, constructed decks, custom decks, and CPU player decks each correspond to one of the eight kinds of classes from class A to class H, and each include 40 cards in total, including class-specific cards and cards shared among classes. Note that a default deck, a constructed deck, or a CPU player deck may include multiple cards of the same kind. In the case where a player possesses multiple cards of the same kind, the player can construct a custom deck that includes multiple cards of the same kind.

Part (A) in FIG. 7 is a figure showing an example game image displayed in the display area 200 in the case where an RPG mode is being executed, which is a game mode in which a player object is moved in an object space on the basis of player inputs and a battle is played against an encountered CPU player while having a conversation with the CPU player.

As shown in part (A) in FIG. 7, in the RPG mode in this embodiment, although not described in detail, a townscape including buildings and roads is disposed in an object space, and a virtual camera is set such that a player object is displayed in a central part of the display area 200. Furthermore, when the player swipes the display area 200 under the player object, the player object is moved in the swipe direction. Furthermore, a menu button 250 is displayed in a lower left part of the display area 200, and a menu image for selecting various kinds of items, which is not shown, is displayed when the player taps the menu button 250.

Furthermore, in the RPG mode in this embodiment, it is possible to set a plurality of kinds of CPU players as the opponent for each of the eight kinds of classes, namely, class A to class H: for example, as a plurality of kinds of CPU players A corresponding to class A, it is possible to set CPU player A1 to CPU player A4 as the opponent; as a plurality of kinds of CPU players B corresponding to class B, it is possible to set CPU player B1 to CPU player B4 as the opponent; . . . (snip) . . . ; and as a plurality of kinds of CPU players H corresponding to class H, it is possible to set CPU player H1 to CPU player H4 as the opponent. Thus, it is possible to set a plurality of kinds of CPU players from CPU player A1 to CPU player H4.

Furthermore, in this embodiment, a plurality of kinds of CPU player objects, namely, CPU player object A1 corresponding to CPU player A1 to CPU player object H4 corresponding to CPU player H4, are disposed so as to be distributed in the object space under a prescribed condition.

Furthermore, in this embodiment, the level of each of the CPU players is set on the basis of the status of proceeding of the game for the player, such as the number of missions cleared, the number of battles, the number of events generated, the number of items acquired, etc. in the RPG mode or other game modes.

Specifically, as shown in FIG. 8, the number of different levels that can be set varies among the CPU players: for example, the level of CPU player A1 changes from level 1 to level 3; the level of CPU player A2 changes from level 1 to level 2; the level of CPU player A3 does not change from level 1; . . . (snip) . . . ; and the level of CPU player H4 changes from level 1 to level 2.

Furthermore, in this embodiment, for each of the CPU players, CPU player decks having different content are stored in the server information storage medium 20 in association with the individual levels that can be set for the CPU player.

Specifically, as shown in FIG. 8, a plurality of kinds of CPU player decks, namely, CPU player deck A1-1 to CPU player deck H4-2, are stored in the server information storage medium 20 as CPU player decks that are used in the case where the individual CPU players are set to the individual levels: for example, CPU player deck A1-1 is associated with level 1 of CPU player A1; CPU player deck A1-2 is associated with level 2 of CPU player A1; . . . (snip) . . . ; and CPU player deck H4-2 is associated with level 2 of CPU player H4.

Furthermore, in this embodiment, when the distance between the player object and the CPU player object becomes less than or equal to a first distance as a result of movement of the player object or the CPU player object, class information 252 indicating the class of the CPU player corresponding to the CPU player object present within the first distance is displayed above the CPU player object.

In the example in part (A) in FIG. 7, since the distance between CPU player object A1 corresponding to CPU player A1 and the player object has become less than or equal to the first distance, class information 252 is displayed above CPU player object A1, indicating that the class thereof is class A.

Furthermore, when the distance between the player object and the CPU player object becomes less than or equal to a second distance as a result of further movement of the player object or the CPU player object, the second distance being shorter than the first distance, a conversation button 254 is displayed in a middle right part of the display area 200.

Furthermore, when the player taps the conversation button 254, as shown in part (B) in FIG. 7, a conversation window 256 indicating the content of a conversation with the CPU player object present within the second distance is displayed in a lower part of the display area 200, and CPU player information 258 indicating the name of the CPU player corresponding to the CPU player object present within the second distance, the class of the CPU player, and the name of the CPU player deck used by the CPU player is displayed in an upper right part of the display area 200.

In the example in part (B) in FIG. 7, since the distance between CPU player object A1 and the player object has become less than or equal to the second distance, words with which CPU player A1 confirms the intent of the player to play a battle are displayed in the conversation window 256, and the CPU player information 258 indicates that the name of the CPU player is CPU player A1 and that the name of the CPU player deck used by the CPU player is CPU player deck A1-1.

Figure 9:
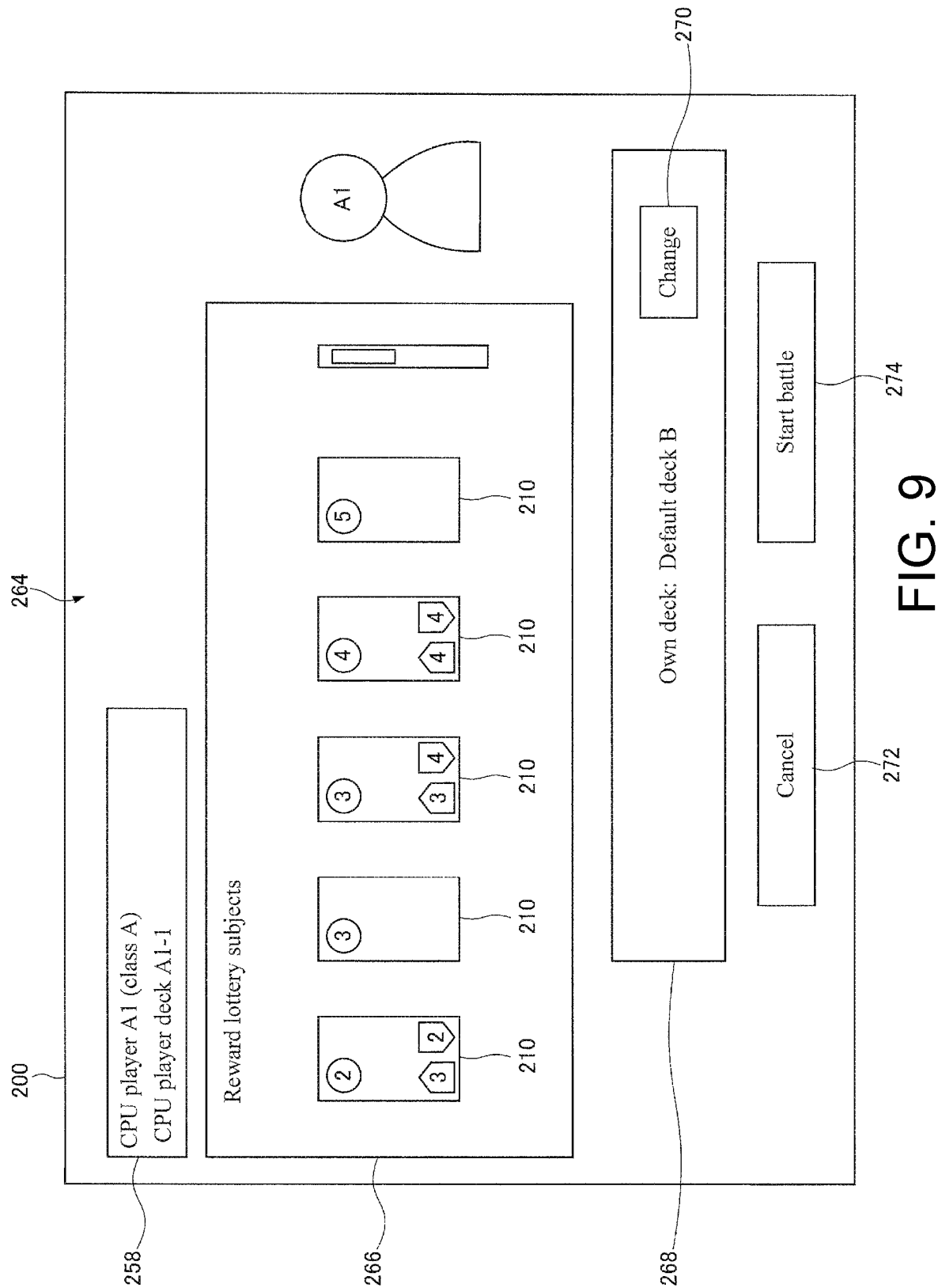
FIG. 9 is a figure showing an image displayed in the display area of the terminal device in the embodiment of the present invention.

Then, a play battle button 260 and a do not play battle button 262 are displayed in a middle right part of the display area 200, and when the player taps the play battle button 260, a battle preparation image 264, shown in FIG. 9, is displayed in the display area 200 for the CPU player in conversation, who is going to serve as the opponent.

As shown in FIG. 9, in the battle preparation image 264, the CPU player information 258 of the CPU player who serves as the opponent is displayed in an upper left part of the display area 200. In the example in FIG. 9, a battle preparation image 264 for CPU player A1, who was having a conversation in the example in part (B) in FIG. 7, is displayed, and the CPU player information 258 indicates that the name of the CPU player is CPU player A1 and that the name of the CPU player deck used by the CPU player is CPU player deck A1-1.

Furthermore, in the RPG mode in this embodiment, in the case of a victory in a battle against a CPU player, cards determined by lotteries are assigned to the player as cards serving as a reward for the victory. As shown in FIG. 9, under the CPU player information 258, lottery subject information 266 indicating the card images 210 of ten lottery subject cards, which serve as the subject of a lottery in the case of a victory in a battle against the CPU player, is displayed.

Furthermore, in this embodiment, ten lottery subject cards are identified as one lottery subject card group, and for each CPU player, lottery subject card groups including different kinds of cards are associated with the individual levels that can be set for the CPU player.

Specifically, as shown in FIG. 8, a plurality of kinds of lottery subject card groups, namely, lottery subject card group A1-1 to lottery subject card group H4-2, are associated as lottery subject card groups that serve as lottery subjects in the case where the individual CPU players are set to the individual levels: for example, lottery subject card group A1-1 is associated with level 1 of CPU player A1; lottery subject card group A1-2 is associated with level 2 of CPU player A1; ... (snip) ... ; and lottery subject card group H4-2 is associated with level 2 of CPU player H4.

Furthermore, the lottery subject information 266 shown in FIG. 9 displays the card images 210 of the lottery subject card group corresponding to the CPU player deck whose name is displayed in the CPU player information 258, i.e., the ten cards included in the lottery subject card group corresponding to the CPU player who serves as the opponent and the level thereof. In this embodiment, five card images 210 are simultaneously displayed in the lottery subject information 266, and other five card images 210 are displayed when a slider displayed at the right end of the lottery subject information 266 is slid up or down.

Furthermore, player deck information 268 indicating the name of the deck used by the player is displayed under the lottery subject information 266, and a change button 270 is displayed at the right end of the player deck information 268. When the player taps the change button 270, although not shown, a deck selection image in which the player selects a deck to use is displayed.

Furthermore, a cancel button 272 and a battle start button 274 are displayed under the player deck information 268. When the player taps the battle start button 274, the CPU player corresponding to the CPU player information 258 is set as the CPU player of the opponent, and the CPU player deck corresponding to the CPU player information 258, i.e., the CPU player deck corresponding to the CPU player of the opponent and the level thereof, is set as the deck used by the CPU player of the opponent. In the example in FIG. 9, CPU player A1 is set as the CPU player of the opponent, and CPU player deck A1-1 is set as the deck used by the CPU player of the opponent.

Then, although not shown, a battle start image indicating the start of a battle between the player and the CPU player is displayed in the display area 200, and then the game image for the card game, shown in FIG. 4, is displayed, and the battle is started.

As described above, in the RPG mode in this embodiment, it is possible to move the player object in the object space, to have a conversation with an encountered CPU player object with reference to the class information 252 displayed above the CPU player object, and to determine whether or not to start a battle against the CPU player by checking the CPU player information 258 and the lottery subject information 266.

Furthermore, in the RPG mode in this embodiment, when the player wins in the battle against the CPU player, three cards determined by lotteries from the ten lottery subject cards included in the lottery subject card group corresponding to the level of the CPU player of the opponent are assigned to the player as cards serving as a reward for the victory.

Specifically, in this embodiment, processing for performing a lottery to determine one victory reward card to be assigned to the player from ten lottery subject cards is executed three times, whereby three victory reward cards to be assigned to the player are determined by lotteries. That is, in this embodiment, three victory reward cards are determined by lotteries through sampling-with-replacement lottery processing, in which the next lottery processing is executed without removing a lottery subject extracted in one lottery from the list of lottery subjects. Therefore, in this embodiment, there are cases where multiple cards of the same kinds are determined as victory reward cards in one lottery.

Here, in this embodiment, each of the ten lottery subject cards included in each lottery subject card group has set therefor one of four levels of rarity, and three victory reward cards are determined with reference to a lottery table in which random numbers are set such that the hit probability is lower as the rarity is higher and the hit probability is higher as the rarity is lower.

Then, as shown in part (A) in FIG. 10, the three card images 210 corresponding to the three victory reward cards determined by lotteries are displayed in the display area 200, and the three victory reward cards determined by lotteries are associated with the player ID of the player, whereby the three victory reward cards are set as cards possessed by the player. In the example in part (A) in FIG. 10, as a result of a victory in a battle against CPU player A1 at level 1, the three card images 210 corresponding to the three victory reward cards determined by lotteries from the ten lottery subject cards included in the lottery subject card group corresponding to CPU player A1 at level 1 are displayed.

Furthermore, in the RPG mode in this embodiment, when the player wins in a battle against a CPU player at a level, in the case where the victory is the first victory against that CPU player at that level, a deck recipe (identification data) for constructing a deck corresponding to the CPU player and the level, as well as a main card, which is a card included in the deck that is constructed according to the deck recipe and which serves as a strategic core in the case where the deck is used in a battle, are assigned to the player as a reward for the first victory.

Here, in this embodiment, the deck recipe includes data for identifying a deck that is constructed according to the deck recipe, as well as data for identifying the content of the deck that is constructed according to the deck recipe, i.e., the kinds of cards and the numbers of the individual kinds of cards included in the 40 cards constituting the deck. Furthermore, in the state where a deck recipe has been assigned to the player, it is possible to construct the deck corresponding to the deck recipe in the case where the player possesses cards corresponding to the kinds of cards and the numbers of the individual kinds of cards identified in the deck recipe.

Furthermore, in this embodiment, for each CPU player, deck recipes for constructing different decks are stored in the server information storage medium 20 in association with individual levels that can be set for the CPU player.

Specifically, as shown in FIG. 8, a plurality of kinds of deck recipes, namely, deck recipe A1-1 to deck recipe H4-2, are stored in the server information storage medium 20 as deck recipes that are assigned as rewards for the first victories in the case where the individual CPU players are set to the individual levels: for example, deck recipe A1-1 is associated with level 1 of CPU player A1; deck recipe A1-2 is associated with level 2 of CPU player A1; . . . (snip) . . . ; and deck recipe H4-2 is associated with level 2 of CPU player H4.

Furthermore, in this embodiment, for each CPU player, different kinds of main cards are associated with the individual levels that can be set for the CPU player.

Specifically, as shown in FIG. 8, a plurality of kinds of main cards, namely, card A017 to card H071, are associated as the main cards to be assigned as rewards for the first victories in the case where the individual CPU players are set to the individual levels: for example, a card with card ID A017 is associated as the main card for level 1 of CPU player A1; a card with card ID A033 is associated as the main card for level 2 of CPU player A1; . . . (snip) . . . ; and a card with card ID H071 is associated as the main card for level 2 of CPU player H4.

Furthermore, in this embodiment, when the player wins in a battle against a CPU player at a level, in the case where the victory is the first victory against that CPU player at that level, as shown in part (B) in FIG. 10, words indicating that the deck recipe corresponding to the CPU player and the level, as well as the main card corresponding to the deck recipe, are assigned to the player as a reward for the first victory are displayed in the conversation window 256. Furthermore, the deck recipe assigned as the reward for the first victory is associated with the player ID of the player, whereby the deck recipe is set as a deck recipe possessed by the player, and the main card assigned as the reward for the first victory is associated with the player ID of the player, whereby the main card is set as a card possessed by the player.

In the example in part (B) in FIG. 10, as a result of the first victory against CPU player A1 at level 1, words indicating that CPU player A1 assigns deck recipe A1-1 corresponding to CPU player A1 at level 1 to the player, as well as a card with the name name17 as the main card corresponding to deck recipe A1-1, are displayed. Furthermore, deck recipe A1-1 corresponding to CPU player A1 is set as a deck recipe possessed by the player, and the main card with the name name17, i.e., a card with card ID A017, is set as a card possessed by the player.

Meanwhile, when the player is defeated in a battle against a CPU player, none of three victory reward cards, a deck recipe, and a main card are assigned to the player.

Furthermore, in the RPG mode in the embodiment, at the end of one battle, a game image in which the player object or the CPU player object is moved, such as the one as shown in part (A) in FIG. 7, is displayed in the display area 200. Furthermore, in this embodiment, it is possible to play battles repeatedly with the same CPU player or other CPU players.

Furthermore, in this embodiment, by repeatedly winning in battles against the same CPU player, it is possible to collect cards included in the deck constructed according to a deck recipe corresponding to the CPU player. Furthermore, when all the cards included in the deck constructed according to a deck recipe corresponding to a CPU player have been set as cards possessed by the player, it becomes possible to construct the deck according to the deck recipe corresponding to the CPU player.

Furthermore, in this embodiment, the deck constructed according to the deck recipe is saved as a custom deck in the server information storage medium 20 in association with the player ID, and is set as a deck that can be selected by the player, i.e., a deck available to the player. That is, in this embodiment, the player is allowed to use a deck constructed according to a deck recipe corresponding to a CPU player with whom the player has played a battle, in battles against other players or CPU players. Note that the deck constructed according to the deck recipe may be saved in the server information storage medium 20 in association with the player ID as a special deck, which is different from a custom deck, and may be set as a deck that can be selected by the player, i.e., a deck available to the player.

Here, in this embodiment, the decks constructed according to the deck recipes for the individual levels of the individual CPU players are decks similar to the CPU player decks for the corresponding individual levels of the corresponding individual CPU players: for example, the deck constructed according to deck recipe A1-1 is a deck similar to CPU player deck A1-1 as a result of some cards included in CPU player deck A1-1 being replaced with other cards; the deck constructed according to deck recipe A1-2 is a deck similar to CPU player deck A1-2 as a result of some cards included in CPU player deck A1-2 being replaced with other cards; . . . (snip) . . . ; and the deck constructed according to deck recipe H4-2 is a deck similar to CPU player deck H4-2 as a result of some cards included in CPU player deck H4-2 being replaced with other cards.

Specifically, in this embodiment, in the deck constructed according to each deck recipe, some cards included in the corresponding CPU player deck are replaced with cards that are more advantageous in terms of the cost, the attacking ability, the physical energy, the effect, the effect invocation condition, the removal condition, or the rarity, i.e., cards having higher values. However, the main card of the deck constructed according to each deck recipe is the same as the main card of the corresponding CPU player deck, and many other cards are shared. Thus, the strategy to be used with the deck constructed according to each deck recipe is the same as the strategy to be used with the corresponding CPU player deck.

That is, the deck constructed according to each deck recipe assigned to the player as a reward for the first victory has basically the same constitution as the corresponding CPU player deck, but is more advantageous for the player than the corresponding CPU player deck because some of the cards are enhanced.

For example, as shown in FIG. 11, in CPU player deck A1-1, 26 cards with card number 00 to card number 25 are cards for class A, and 14 cards with card number 26 to card number 39 are cards shared among classes. Furthermore, in CPU player deck A1-1, the card with card number 05 is a card with card ID A001, whereas in the deck constructed according to deck recipe A1-1, the card with card number 05 is enhanced to a card with card ID A002; . . . (snip) . . . ; and in CPU player deck A1-1, the card with card number 31 is a card with card ID I003, whereas in the deck constructed according to deck recipe A1-1, the card with card number 31 is enhanced to a card with card ID I006. That is, three cards for class A and two cards shared among classes, included in CPU player deck A1-1, are replaced with enhanced cards in the deck constructed according to deck recipe A1-1.

However, the remaining 23 cards for class A and 12 cards shared among classes are the same between CPU player deck A1-1 and the deck constructed according to deck recipe A1-1. Furthermore, in the CPU player deck A1-1 and the deck constructed according to deck recipe A1-1, the card with card number 18 and card ID A017 is set as the main card, i.e., the main card is the same between CPU player deck A1-1 and the deck constructed according to deck recipe A1-1.

Furthermore, in this embodiment, as the ten lottery subject cards in the lottery subject card group corresponding to each level of each CPU player, described earlier, cards (first specific game media) included in both the CPU player deck corresponding to the CPU player and the level and the deck constructed according to the deck recipe corresponding to the CPU player and the level are set, and cards (second game media) not included in the CPU player deck corresponding to the CPU player and the level but included in the deck constructed according to the deck recipe corresponding to the CPU player and the level are set.

For example, as shown in FIG. 11, of the ten lottery subject cards in the lottery subject card group associated with CPU player A1, the card with card ID A006 is a card included in both CPU player deck A1-1 and the deck constructed according to deck recipe A1-1; the card with card ID A009 is an enhanced card included in both CPU player deck A1-1 and the deck constructed according to deck recipe A1-1; . . . (snip) . . . ; the card with card ID A019 is an enhanced card not included in the CPU player deck but included in the deck constructed according to the deck recipe; . . . (snip) . . . ; and the card with card ID I015 is a card included in both CPU player deck A1-1 and the deck constructed according to deck recipe A1-1.

As described above, in this embodiment, since the deck constructed according to the deck recipe corresponding to each level of each CPU player is similar to the CPU player deck corresponding to the CPU player and the level, the player can understand how to use cards in the deck constructed according to the deck recipe corresponding to the CPU player and the level in the course of repeatedly playing battles against the CPU player at the level. Thus, in this embodiment, it is possible to make it easier for the player to use decks constructed according to deck recipes corresponding to individual levels of individual CPU players in battles.

Here, in this embodiment, in a battle against the player, each CPU player at each level may be controlled to place cards in the field on the basis of an algorithm in which the probabilities of using the main card or the ten lottery subject cards in the lottery subject card group corresponding to the CPU player and the level are set to be high.

Note that, in this embodiment, cards that can be set as cards possessed by the player on condition that the player clears a mission or otherwise proceeds with the game, as well as cards that can be set as cards possessed by the player on condition that the player makes payment in an in-game currency or a real currency, are included in cards constituting decks constructed according to individual deck recipes and are also included in the ten lottery subject cards in individual lottery subject card groups.

However, the individual main cards, as well as the cards included in default decks, which are possessed by the player from the time when the player starts the game for the first time, are not included in the ten lottery subject cards in the individual lottery subject card groups.

For example, as shown in FIG. 11, the card with card number 18 and card ID A017, which is a main card, is not set as the ten lottery subject cards. Furthermore, the card with card number 00 and card ID A000 or the card with card number 05 and card ID A002, which are cards included in default decks, are not set as the ten lottery subject cards.

Figure 12:
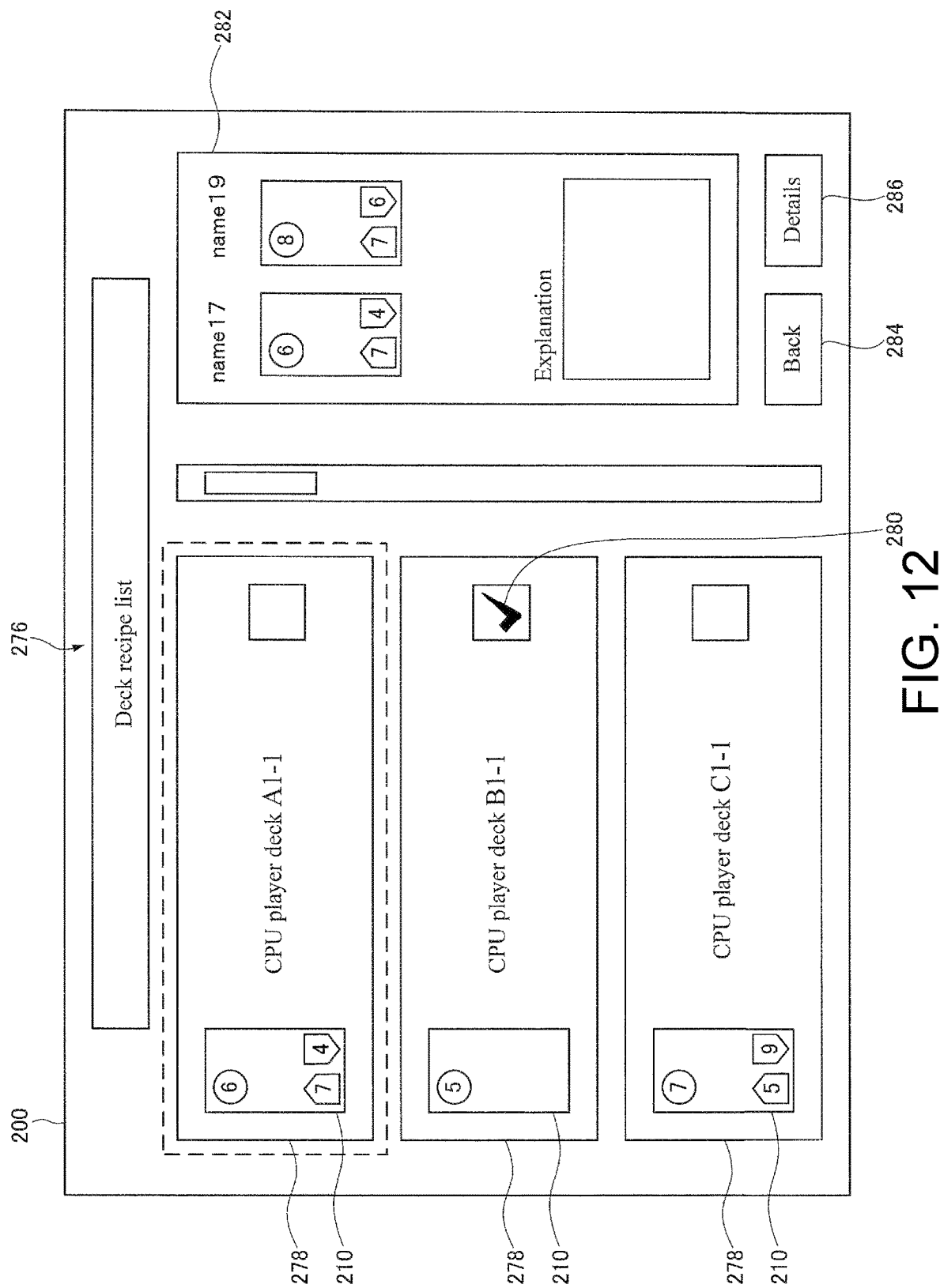
FIG. 12 is a figure showing an image displayed in the display area of the terminal device in the embodiment of the present invention.

FIG. 12 is a figure showing an example deck-recipe list image 276 showing deck recipes possessed by the player. In this embodiment, when a prescribed button is tapped in a menu image, which is not shown, displayed in the display area 200 when the player taps the menu button 250 shown in part (A) in FIG. 7, etc., a deck-recipe list image 276 is displayed in the display area 200.

Specifically, in the deck-recipe list image 276, as shown in FIG. 12, deck recipe buttons 278 corresponding to deck recipes possessed by the player are displayed in the left half of the display area 200. Furthermore, each of the deck recipe buttons 278 displays the card image 210 of the main card of the deck constructed according to the deck recipe, the name of the deck constructed according to the deck recipe, and a construction enabled indication 280 in the case where it is possible to construct a deck according to the deck recipe.

In this embodiment, the name of the deck constructed according to the deck recipe corresponding to each level of each CPU player is the same as the name of the CPU player deck corresponding to the CPU player and the level.

In the example in FIG. 12, a deck recipe button 278 corresponding to deck recipe A1-1 is displayed at the first position from the top, a deck recipe button 278 corresponding to deck recipe B1-1 is displayed at the second position from the top, and a deck recipe button 278 corresponding to deck recipe C1-1 is displayed at the third position from the top.

Furthermore, the second deck recipe button 278 from the top, corresponding to deck recipe B1-1, displays a construction enabled indication 280, whereas the first deck recipe button 278 from the top, corresponding to deck recipe A1-1, or the third deck recipe button 278 from the top, corresponding to deck recipe C1-1, does not display a construction enabled indication 280.

Furthermore, in the deck-recipe list image 276 in this embodiment, three deck recipe buttons 278 are displayed simultaneously, and deck recipe buttons 278 corresponding to other deck recipes possessed by the player are displayed when a slider displayed on the right side of the deck recipe buttons 278 is slid up or down.

Furthermore, in the deck-recipe list image 276, when the player taps one of the deck recipe buttons 278, the tapped deck recipe button 278 is displayed in a highlighted manner, and deck-recipe summary information 282, which is information concerning the deck recipe corresponding to the tapped deck recipe button 278, is displayed in the right half of the display area 200. In the example in FIG. 12, as a result of the first deck recipe button 278 from the top, corresponding to deck recipe A1-1, being tapped, deck-recipe summary information 282 corresponding to deck recipe A1-1 is displayed in the right half of the display area 200.

Figure 13:
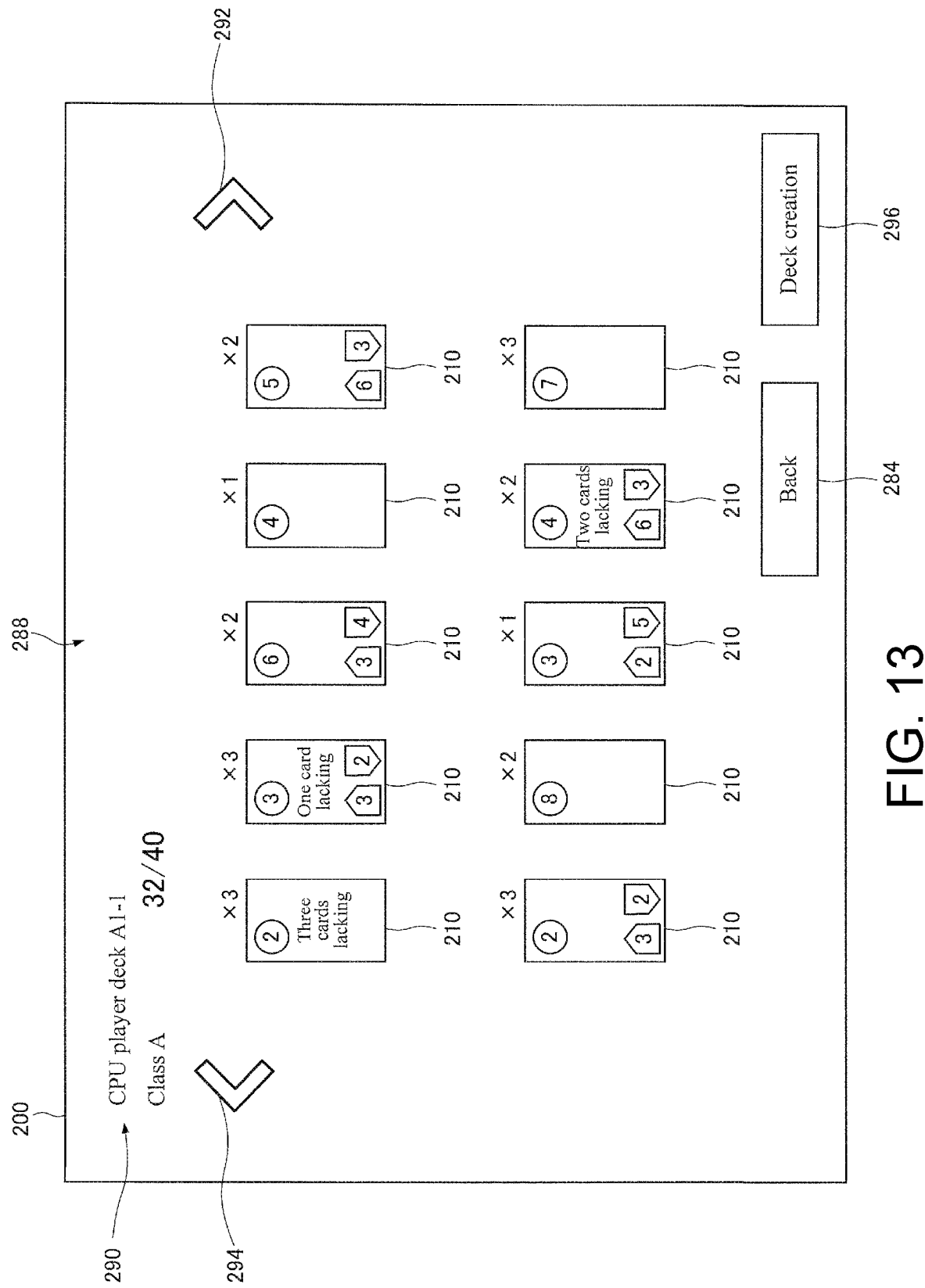
FIG. 13 is a figure showing an image displayed in the display area of the terminal device in the embodiment of the present invention.

Furthermore, a back button 284 and a details button 286 are displayed under the deck-recipe summary information 282. When the player taps the details button 286, a deck-recipe detail image 288 shown in FIG. 13 is displayed. Specifically, the deck-recipe detail image 288 shows details of the deck-recipe summary information 282 displayed in the deck-recipe list image 276 shown in FIG. 12. Furthermore, as shown in FIG. 13, deck recipe information 290 is displayed in an upper left part of the display area 200, indicating the name of the deck constructed according to the deck recipe corresponding to the deck-recipe detail image 288, the class corresponding to the deck constructed according to the deck recipe, and the number of possessed cards indicating the number of cards possessed by the player among the cards included in the deck constructed according to the deck recipe.

In the example in FIG. 13, as a result of the details button 286 being tapped in the state where the deck-recipe summary information 282 corresponding to deck recipe A1 is displayed in the right half of the display area 200, as shown in the example in FIG. 12, the deck recipe information 290 in the example in FIG. 13 indicates that the name of the deck constructed according to deck recipe A1-1 is CPU player deck A1-1, the class corresponding to the deck constructed according to deck recipe A1-1 is class A, and the number of possessed cards indicating the number of cards possessed by the player among the cards included in the deck constructed according to deck recipe A1-1 is 32/40.

Furthermore, in the deck-recipe detail image 288, under the deck recipe information 290, the card images 210 of the cards included in the deck constructed according to the deck recipe are displayed. Each of the card images 210 displays the number of cards needed, which is the number of cards corresponding to the card image 210 and needed for constructing a deck according to the deck recipe, and the number of cards lacking, which is the number of cards corresponding to the card image 210 and lacking for constructing a deck according to the deck recipe.

In the example in FIG. 13, with the card corresponding to the first card image 210 from the left in the upper row, the number of cards needed is three, and the number of cards lacking is three. Thus, with the first card image 210 from the left in the upper row, "×3" is displayed to indicate that the number of cards needed is three, and "three cards lacking" is displayed to indicate that the number of cards lacking is three. Furthermore, with the first card image 210 from the left in the lower row, the number of cards needed is three, and the number of cards lacking is zero. Thus, with the first card image 210 from the left in the lower row, "×3" is displayed to indicate that the number of cards needed is three, but the number of cards lacking is not displayed.

That is, in this embodiment, even if the player possesses the cards included in a deck constructed according to a deck recipe, it is not possible to construct the deck according to the deck recipe unless the player possesses the needed numbers of cards corresponding to the individual cards set in that deck recipe. Note, however, that the cards possessed by the player may be used as multiple cards in a plurality of decks, such as a default deck and a deck constructed according to another deck recipe.

Furthermore, in the deck-recipe detail image 288 in this embodiment, ten card images 210 are displayed simultaneously. The next card image 210 is displayed when the player taps a right arrow 292, and the previous card image 210 is displayed when the player taps a left arrow 294.

Furthermore, in the deck-recipe detail image 288 in this embodiment, a back button 284 and a deck creation button 296 are displayed in a lower part of the display area 200. When the player taps the deck creation button 296, in the case where none of the card images 210 display the number of cards lacking, i.e., in the case where it is possible to construct a deck according to the deck recipe corresponding to the deck-recipe detail image 288, the deck constructed according to the deck recipe is associated with the player ID of the player, whereby the deck is set as a deck available to the player.

For example, when the second deck recipe button 278 from the top, corresponding to deck recipe B1-1 and displaying the construction enabled indication 280, is tapped in the deck-recipe list image 276 in FIG. 12, and the details button 286 is tapped in the state where the deck-recipe summary information 282 corresponding to deck recipe B1-1 is displayed in the right half of the display area 200, although not shown, a deck-recipe detail image 288 corresponding to deck recipe B1-1 is displayed.

Then, in this case, since it is possible to construct a deck according to deck recipe B1-1, in the deck-recipe detail image 288 corresponding to deck recipe B1-1, none of the card images 210 display the number of cards lacking, and when the player taps the deck creation button 296, the deck constructed according to deck recipe B1-1 is set as a deck available to the player.

Meanwhile, when the first deck recipe button 278 from the top, corresponding to deck recipe A1-1 and displaying no construction enabled indication 280, is tapped in the deck-recipe list image 276 in FIG. 12, and the details button 286 is tapped in the state where the deck-recipe summary information 282 corresponding to deck recipe A1-1 is displayed in the right half of the display area 200, as shown in the example in FIG. 13, the deck-recipe detail image 288 corresponding to deck recipe A1-1 is displayed.

Then, in this case, since it is not possible to construct a deck according to deck recipe A1-1, in the deck-recipe detail image 288 corresponding to deck recipe A1-1, one or more of the card images 210 display the number of cards lacking, and when the player taps the deck creation button 296, although not shown, a warning image indicating that it is not possible to construct a deck according to deck recipe A1-1 is displayed in the display area 200, and the deck constructed according to deck recipe A1-1 is not set as a deck available to the player.

As described above, in the RPG mode in this embodiment, the player can check whether or not it is possible to construct decks according to the deck recipes corresponding to the individual deck recipe buttons 278 in the deck-recipe list image 276 shown in FIG. 12, on the basis of whether or not each of the deck recipe buttons 278 displays a construction enabled indication 280. Furthermore, the player can check the kinds and numbers of cards lacking for constructing a deck according to the deck recipe in the deck-recipe detail image 288 shown in FIG. 13.

FIG. 14 is a figure showing relationships between the status of proceeding of the game and the individual CPU player decks. In this embodiment, the chapter in which the player is currently present is updated sequentially from chapter 1 to chapter 10 on the basis of the status of proceeding of the game for the player, such as the number of battles and the number of events generated in the RPG mode or other game modes.

Furthermore, in this embodiment, in the master lists shown in FIG. 5, cards corresponding to the chapter in which the player is currently present are set as cards available in the game. Specifically, as shown in FIG. 14, in chapters 1 to 4, cards included in card pack 1 are set as cards available in the game; in chapter 5, cards included in card pack 2 in addition to card pack 1 are set as cards available in the game; in chapter 6, cards included in card pack 3 in addition to card packs 1 and 2 are set as cards available in the game; in chapter 7, cards included in card pack 4 in addition to card packs 1 to 3 are set as cards available in the game; and in chapters 8 to 10, cards included in card pack 5 in addition to card packs 1 to 4 are set as cards available in the game.

Note that there may be cases where card packs are removed as well as cases where card packs are added. Furthermore, the cards included in the removed card packs may be set as cards unavailable in the game.

Furthermore, in this embodiment, the levels of the individual CPU players are set correspondingly to the chapter in which the player is currently present. Furthermore, when one of the CPU players is set as the opponent, the CPU player deck corresponding to the level set for the CPU player serving as the opponent is set as a deck used by the CPU player.

Specifically, as shown in FIG. 14, for CPU player A1 in class A, in chapters 1 to 4, the level of CPU player A1 is set to level 1, and CPU player deck A1-1 constructed with cards included in card pack 1 is set as a deck used by CPU player A1; in chapter 5, the level of CPU player A1 is set to level 2, and CPU player deck A1-2 constructed with cards included in card packs 1 and 2 is added as a deck used by CPU player A1; and in chapters 6 to 10, the level of CPU player A1 is set to level 3, and CPU player deck A1-3 constructed with cards included in card packs 1 to 3 is added as a deck used by CPU player A1.

Specifically, for CPU player A1 in class A, in CPU player deck A1-2 added in chapter 5, as the cards included in card pack 2 are set as cards available in the game, some of the cards included in CPU player deck A1-1 are replaced with cards included in card pack 2 and having higher values; and in CPU player deck A1-3 added in chapter 6, as the cards included in card pack 3 are set as cards available in the game, some of the cards included in CPU player deck A1-2 are replaced with cards included in card pack 3 and having higher values.

Furthermore, for CPU player A2 in class A, in chapters 1 to 4, CPU player object A2 corresponding to CPU player A2 is not set in the object space; in chapter 5, the level of CPU player A2 is set to level 1, and CPU player deck A2-1 constructed with the cards included in card packs 1 and 2 is set as a deck used by CPU player A2; and in chapters 6 to 10, the level of CPU player A2 is set to level 2, and CPU player deck A2-2 constructed with the cards included in card packs 1 to 3 is added as a deck used by CPU player A2.

Furthermore, for CPU player H4, displayed in the lowermost row for class H, in chapters 1 to 6, CPU player object H4 corresponding to CPU player H4 is not set in the object space; in chapter 7, the level of CPU player H4 is set to level 1, and CPU player deck H4-1 constructed with the cards included in card packs 1 to 4 is set as a deck used by CPU player H4; and in chapters 8 to 10, the level of CPU player H4 is set to level 2, and CPU player deck H4-2 constructed with the cards included in card packs 1 to 5 is added as a level-2 deck used by CPU player H4.

Figure 15:
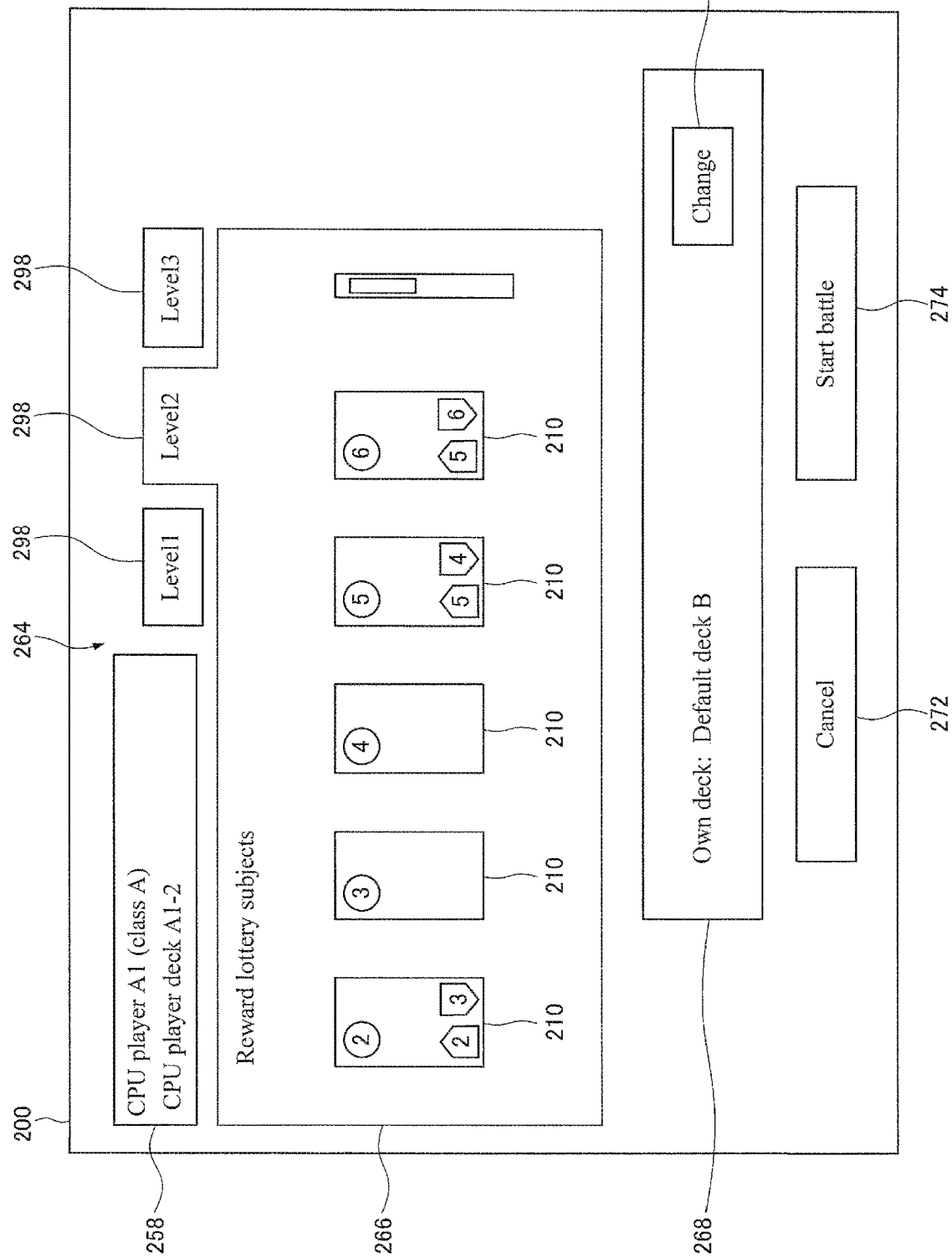
FIG. 15 is a figure showing an image displayed in the display area of the terminal device in the embodiment of the present invention.

Furthermore, in this embodiment, for example, in chapters 1 to 4, when the player taps the play battle button 260 in the state shown in part (B) in FIG. 7, the battle preparation image 264 for CPU player A1, shown in FIG. 9, is displayed in the display area 200; and for example, in chapters 6 to 10, when the player taps the play battle button 260 in the state shown in part (B) in FIG. 7, a battle preparation image 264 for CPU player A1, shown in FIG. 15, is displayed in the display area 200.

Specifically, in the battle preparation image 264 for CPU player A1, shown in FIG. 15, three level buttons 298 corresponding to level 1 to level 3 are displayed in lottery subject information 266. When the player taps the level button 298 corresponding to level 1, the level of CPU player A1 is set to level 1, and although not shown, lottery subject information 266 showing the card images 210 of the ten lottery subject cards included in the lottery subject card group A1-1 is displayed in the display area 200.

Furthermore, when the player taps the level button 298 corresponding to level 2, the level of CPU player A1 is set to level 2, and as shown in FIG. 15, lottery subject information 266 showing the card images 210 of the ten lottery subject cards included in the lottery subject card group A1-2 is displayed in the display area 200.

Furthermore, when the player taps the level button 298 corresponding to level 3, the level of CPU player A1 is set to level 3, and although not shown, lottery subject information 266 showing the card images 210 of the ten lottery subject cards included in the lottery subject card group A1-3 is displayed in the display area 200.

Furthermore, in this embodiment, when the player taps the battle start button 274 in the state where the level of CPU player A1 is set to level 1, CPU player A1 is set as the CPU player of the opponent, and CPU player deck A1-1 is set as the deck used by the CPU player of the opponent. Furthermore, when the player defeats CPU player A1 at level 1, three victory reward cards are determined by lotteries from the ten lottery subject cards included in the lottery subject card group A1-1 and are assigned to the player. In the case of the first victory against CPU player A1 at level 1, deck recipe A1-1, as well as the card with card ID A017, which is the main card of the deck constructed according to deck recipe A1-1, are assigned to the player as a reward for the first victory.

Furthermore, when the player taps the battle start button 274 in the state where the level of CPU player A1 is set to level 2, CPU player A1 is set as the CPU player of the opponent, and CPU player deck A1-2 is set as the deck used by the CPU player of the opponent. Furthermore, when the player defeats CPU player A1 at level 2, three victory reward cards are determined by lotteries from the ten lottery subject cards included in the lottery subject card groups A1-2 and are assigned to the player. In the case of the first victory against CPU player A1 at level 2, deck recipe A1-2, as well as the card with card ID A033, which is the main card of the deck constructed according to deck recipe A1-2, are assigned to the player as a reward for the first victory.

Furthermore, when the player taps the battle start button 274 in the state where the level of CPU player A1 is set to level 3, CPU player A1 is set as the CPU player of the opponent, and CPU player deck A1-3 is set as the deck used by the CPU player of the opponent. Furthermore, when the player defeats CPU player A1 at level 3, three victory reward cards are determined by lotteries from the ten lottery subject cards included in the lottery subject card group A1-3 and are assigned to the player. In the case of the first victory against CPU player A1 at level 3, deck recipe A1-3, as well as the card with card ID A056, which is the main card of the deck constructed according to deck recipe A1-3, are assigned to the player as a reward for the first victory.

Here, in this embodiment, in the case where the chapter in which the player is currently present is one of chapters 1 to 4, the three level buttons 298 are not displayed in the battle preparation image 264 for CPU player A1, shown in FIG. 9, the level of CPU player A1 is set to level 1, and lottery subject information 266 showing the card images 210 of the ten lottery subject cards included in the lottery subject card group A1-1 is displayed.

Furthermore, when the player taps the battle start button 274 in the battle preparation image 264 for CPU player A1, shown in FIG. 9, CPU player A1 is set as the CPU player of the opponent, and CPU player deck A1-1 is set as the deck used by the CPU player of the opponent. Furthermore, when the player defeats CPU player A1 at level 1, three victory reward cards are determined by lotteries from the ten lottery subject cards included in the lottery subject card group A1-1 and are assigned to the player. In the case of the first victory against CPU player A1 at level 1, deck recipe A1-1, as well as the card with card ID A017, which is the main card of the deck constructed according to deck recipe A1-1, are assigned to the player as a reward for the first victory.

Since what is described above similarly applies to the individual levels of other CPU players, detailed descriptions thereof will be omitted.

As described above, in this embodiment, even when the chapter proceeds and the level of a CPU player becomes higher, it is possible to play battles against CPU players at previous levels, and it is possible to assign deck recipes, main cards, and victory reward cards corresponding to previous levels to the player.

Figure 16:
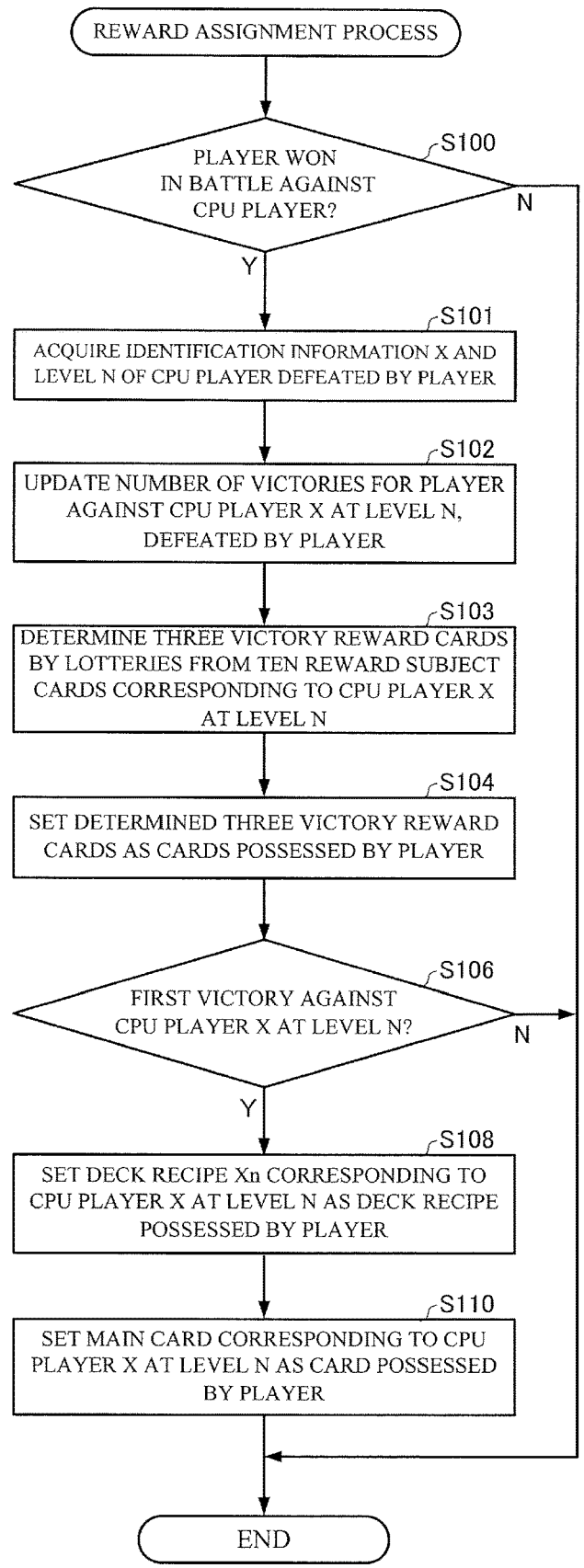
FIG. 16 is a flowchart showing a process at the server device in the embodiment of the present invention.
Figure 17:
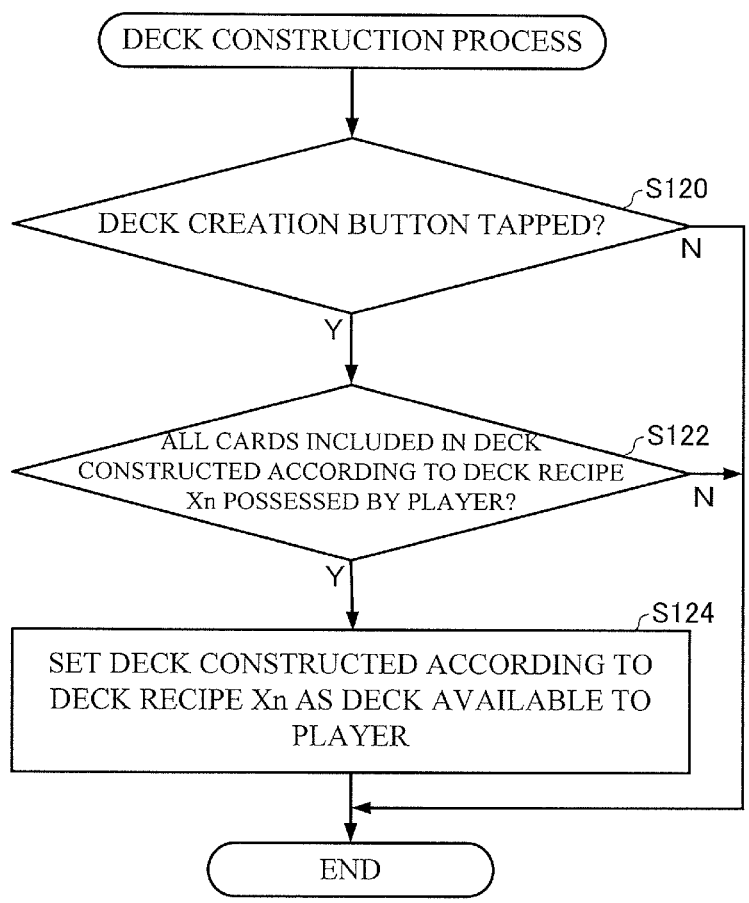
FIG. 17 is a flowchart showing a process at the server device in the embodiment of the present invention.

The following describes the flows of processes executed at the server device 12 in this embodiment with reference to flowcharts in FIGS. 16 and 17.

First, in a reward assignment process shown in FIG. 16, the reward processing unit 48 determines whether or not the player has won in a battle against a CPU player (step S100). When it is determined that the player has won in a battle against a CPU player (Y in step S100), the reward processing unit 48 acquires identification information (ID) X (X is a variable) of the CPU player defeated by the player, as well as the level N (N is a variable) of the CPU player (step S101), and updates the number of victories for the player against the CPU player X at the level N, defeated by the player (step S102).

Furthermore, the reward processing unit 48 determines three victory reward cards by lotteries from the ten reward subject cards included in the lottery subject card group corresponding to the CPU player X at the level N (step S103), and sets the determined three victory reward cards as cards possessed by the player (step S104).

Then, the reward processing unit 48 determines whether or not the number of victories against the CPU player X at the level N is one, i.e., whether or not the victory is the first victory against the CPU player X at the level N (step S106). When it is determined that the victory is the first victory against the CPU player X at the level N (Y in step S106), the reward processing unit 48 sets the deck recipe Xn (Xn is a variable) corresponding to the CPU player X at the level N as a deck recipe possessed by the player (step S108), and sets the main card corresponding to the CPU player X at the level N as a card possessed by the player (step S110).

Furthermore, in a deck construction process shown in FIG. 17, the deck processing unit 45 determines whether the deck creation button 296 has been tapped (step S120). When it is determined that the deck creation button 296 has been tapped (Y in step S120), the deck processing unit 45 determines whether or not the player possesses all the cards included in the deck constructed according to the deck recipe Xn corresponding to the deck-recipe detail image 288 (step S122). Furthermore, when it is determined by the deck processing unit 45 that the player possesses all the cards included in the deck constructed according to the deck recipe Xn (Y in step S122), the deck processing unit 45 sets the deck constructed according to the deck recipe Xn as a deck available to the player (step S124).

3. Modifications

The present invention can be modified and embodied in various forms, without limitation to the embodiment described above. The following introduces modifications. Note that the embodiment described above and various methods described below as modifications can be adopted in combinations as appropriate as methods for realizing the present invention.

First, although the above-described embodiment has been described in the context of an example where master lists include per-class master lists and a shared master list, master lists may include either per-class master lists or a shared master list. Furthermore, a shared master list may be created by extracting or combining card information included in the per-class master lists, or per-class master lists may be created by extracting or combining card information included in the shared master list.

Furthermore, although the above-described embodiment has been described in the context of an example where three victory reward cards are determined through sampling-with-replacement lottery processing, in which the next lottery processing is executed without removing a lottery subject extracted in one lottery from the list of lottery subjects, three victory reward cards may be determined through sampling-without-replacement lottery processing, in which the next lottery processing is executed after removing a lottery subject extracted in one lottery from the list of lottery subjects, such that there are no cases where multiple cards of the same kind are determined as victory reward cards in one lottery.

Furthermore, although the above-described embodiment has been described in the context of an example where, as the ten lottery subject cards in the lottery subject card group corresponding to each level of each CPU player, cards (first specific game media) included in both the CPU player deck corresponding to the CPU player and the level and the deck constructed according to the deck recipe corresponding to the CPU player and the level are set, and cards (second specific game media) not included in the CPU player deck corresponding to the CPU player and the level and included in the deck constructed according to the deck recipe corresponding to the CPU player and the level, as the ten lottery subject cards in the lottery subject card group corresponding to each level of each CPU player, cards included in both the CPU player deck corresponding to the CPU player and the level and the deck constructed according to the deck recipe corresponding to the CPU player and the level may only be set, or cards not included in the CPU player deck corresponding to the CPU player and the level and included in the deck constructed according to the deck recipe corresponding to the CPU player and the level may only be set.

Furthermore, although the above-described embodiment has been described in the context of an example where cards that can be set as cards possessed by the player on condition that the player clears a mission or otherwise proceeds with the game or on condition that the player makes payment in an in-game currency or a real currency are also set as the cards included in the deck constructed according to each deck recipe and the ten lottery subject cards associated with each CPU player, as the cards included in the deck constructed according to each deck recipe, cards assigned to the player as victory rewards may only be set, or as the ten lottery subject cards associated with each CPU player, cards assigned to the player as victory rewards may only be set.

Furthermore, although the above-described embodiment has been described in the context of an example where the main card of the CPU player deck or the cards included in the default deck, corresponding to each level of each CPU player, are not set as the ten lottery subject cards in the lottery subject card group corresponding to the CPU player and the level, the main card of the CPU player deck or the cards included in the default deck, corresponding to each level of each CPU player, may also be set as the ten lottery subject cards in the lottery subject card group corresponding to the CPU player and the level.

Furthermore, although the above-described embodiment has been described in the context of an example where ten lottery subject cards are set in the lottery subject card group corresponding to each level of each CPU player, in the lottery subject card group corresponding to each level of each CPU player, all the cards included in the deck constructed according to the deck recipe corresponding to the CPU player and the level may be set.

Furthermore, although the above-described embodiment has been described in the context of an example where cards or deck recipes are assigned to the player in the case where the player wins in a battle against a CPU player, cards or deck recipes may be assigned to the player under a prescribed condition even in the case where the player is defeated in a battle against a CPU player, or cards or deck recipes may be assigned to the player under a prescribed condition even in the case where a battle against a CPU player is terminated in the middle.

Furthermore, although the above-described embodiment has been described in the context of an example where the deck recipe and the main card corresponding to the CPU player serving as the opponent are assigned to the player in the case of the first victory against the CPU player, the deck recipe and the main card corresponding to the CPU player serving as the opponent may be assigned to the player in the case of the N-th victory against the CPU player, or the timing of assigning the deck recipe and the timing of assigning the main card may be different from each other.

Furthermore, although the above-described embodiment has been described in the context of an example where the deck according to the deck recipe corresponding to each level of each CPU player is similar to the CPU player deck corresponding to the CPU player and the level, the deck according to the deck recipe corresponding to each level of each CPU player may be the same as the CPU player deck corresponding to the CPU player and the level. That is, "the game medium group corresponding to the non-player character of the opponent" and "the game medium group used by the non-player character of the opponent" may be different game medium groups or the same game medium group.

Alternatively, the decks according to some deck recipes corresponding to one of the levels of a CPU player may be similar to the CPU player decks corresponding to the CPU player and the level, while the decks according to the other deck recipes may be the same as the CPU player decks corresponding to the CPU player and the level. That is, there may exist "identification data" with which "the game medium group corresponding to the non-player character of the opponent" and "the game medium group used by the non-player character of the opponent" are different game medium groups and "identification data" with which "the game medium group corresponding to the non-player character of the opponent" and "the game medium group used by the non-player character of the opponent" are the same game medium group.

Furthermore, although the above-described embodiment has been described in the context of an example where when a deck recipe button 278 displaying a construction enabled indication 280 is tapped in the deck-recipe list image 276 in FIG. 12, and the deck creation button 296 is tapped in the deck-recipe detail image 288 in FIG. 13, the deck constructed according to the deck recipe is set as a deck available to the player, when all the cards included in the deck constructed according to a deck recipe are set as cards possessed by the player, the deck constructed according to the deck recipe may be automatically set as a deck available to the player, without requiring any player input.

Furthermore, although the above-described embodiment has been described in the context of an example where the main card also changes when the level of a CPU player changes, the main card may remain the same when the level of a CPU player changes.

Furthermore, although the above-described embodiment has been described in the context of an example where the level of a CPU player changes, the level of a CPU player may remain the same. In this case, for each CPU player, one CPU player deck used by the CPU player, one lottery subject card group for determining a victory reward for the CPU player, and one deck recipe and one main card that serve as a reward for the first victory against the CPU player may be associated.

Furthermore, although the above-described embodiment has been described in the context of an example where the present invention is applied to a game app for smartphones, the present invention may be applied to game devices (information processing devices) installed in commercial establishments or to household game devices (information processing devices). Furthermore, in the case where the present invention is applied to game devices installed in commercial establishments or to household game devices, by using terminal devices as game devices, a plurality of game devices may carry out communication mutually with a server device. In this case, the present invention may be applied to the game devices or to the server device. Alternatively, the present invention may be applied to standalone game devices that are not connected to the server device 12. Furthermore, in the case where the present invention is applied to game devices installed in commercial establishments or to household game devices, the functions of the individual units described with reference to FIGS. 2 and 3 may be configured as shown in FIG. 18.

Figure 18:
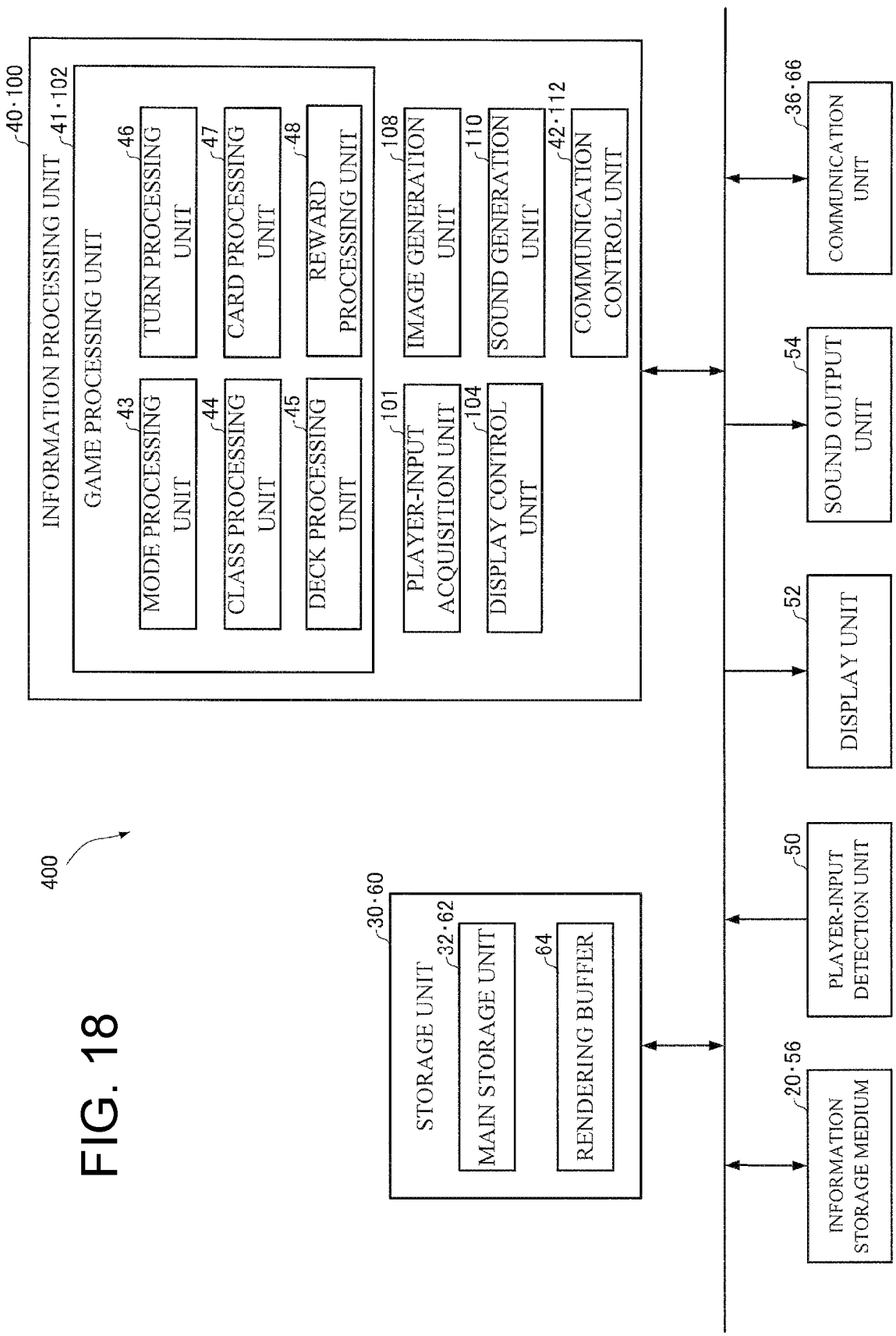
FIG. 18 is a functional block diagram showing the functions of a game device in a modified embodiment of the present invention.

Specifically, as shown in FIG. 18, a game device 400 includes: an information storage medium 20/56 at least partially provided with the functions of the server information storage medium 20 and the terminal information storage medium 56; a storage unit 30/60 at least partially provided with the functions of the server storage unit 30 and the terminal storage unit 60; a main storage unit 32/62 at least partially provided with the functions of the main storage unit 32 and the main storage unit 62; and a rendering buffer 64. Furthermore, the game device 400 is at least partially provided with the functions of the player-input detection unit 50, the display unit 52, and the sound output unit 54. Furthermore, the game device 400 includes: a communication unit 36/66 at least partially provided with the functions of the server communication unit 36 and the terminal communication unit 66; an information processing unit 40/100 at least partially provided with the functions of the server information processing unit 40 and the terminal information processing unit 100; and a game processing unit 41/102 at least partially provided with the functions of the server game processing unit 41 and the terminal game processing unit 102. Specifically, as the game processing unit 41/102, the game device 400 is at least partially provided with the functions of the mode processing unit 43, the class processing unit 44, the deck processing unit 45, the turn processing unit 46, the card processing unit 47, and the reward processing unit 48. Furthermore, the game device 400 is at least partially provided with the functions of the player-input acquisition unit 101, the display control unit 104, the image generation unit 108, and the sound generation unit 110. Furthermore, the game device 400 includes a communication control unit 42/112 at least partially provided with the functions of the server communication control unit 42 and the terminal communication control unit 112.

What is claimed is:

1. A non-transitory computer-readable information storage medium storing a program, the program causing a computer to perform a method comprising:

executing a card battle game based on a first plurality of cards that are included in a first card group that is used by a first non-player character of an opponent and a second plurality of cards included in a second card group that is used by a player;

assigning a portion of identification data to the player based on a result of the card battle game, the portion of the identification data identifying content of the first card group corresponding to the first non-player character of the opponent, wherein the identification data identifies a plurality of content of the first card group corresponding to each of a plurality of non-player characters comprising the first non-player character;

assigning a first card that is included in the first card group used by the first non-player character of the opponent among the first plurality of cards that are included in the first card group corresponding to the first non-player character of the opponent based on the result of the card battle game;

setting the first card group corresponding for one of the plurality of non-player characters as a card group that is used by the player based on the portion of the identification data and the first card that is assigned to the player; and determining a second card that is assigned to the player from a card other than the first card among the first plurality of cards being included in the first card group corresponding to the first non-player character of the opponent based on the result of the card battle game, wherein the second card is assigned to the player.

2. An information processing device comprising:

a processor; and a memory connected to the processor, wherein the memory comprises a program configured to perform a method comprising:

executing a card battle game based on a first plurality of cards that are included in a first card group that is used by a first non-player character of an opponent and a second plurality of cards included in a second card group that is used by a player;

assigning a portion of identification data to the player based on a result of the card battle game, the portion of the identification data identifying content of the first card group corresponding to the first non-player character of the opponent, wherein the identification data identifies a plurality of content of the first card group corresponding to each of a plurality of non-player characters comprising the first non-player character;

assigning a first card that is included in the first card group used by the first non-player character of the opponent among the first plurality of cards that are included in the first card group corresponding to the first non-player character of the opponent based on the result of the card battle game;

setting the first card group corresponding for one of the plurality of non-player characters as a card group that is used by the player based on the portion of the identification data and the first card that is assigned to the player; and determining a second card assigned to the player from a card other than the first card among the first plurality of cards being included in the first card group corresponding to the first non-player character of the opponent based on the result of the card battle game, wherein the second card is assigned to the player.

3. A control method comprising:

executing a card battle game based on a first plurality of cards that are included in a first card group that is used by a first non-player character of an opponent and a second plurality of cards included in a second card group that is used by a player;

assigning a portion of identification data to the player based on a result of the card battle game, the portion of the identification data identifying content of the first card group corresponding to the first non-player character of the opponent, wherein the identification data identifies a plurality of content of the first card group corresponding to each of a plurality of non-player characters comprising the first non-player character;

assigning a first card that is included in the first card group used by the first non-player character of the opponent among the first plurality of cards that are included in the first card group corresponding to the first non-player character of the opponent based on the result of the card battle game;

setting the first card group corresponding for one of the plurality of non-player characters as a card group that is used by the player based on the portion of the identification data and the first card that is assigned to the player; and determining a second card assigned to the player from a card other than the first card among the first plurality of cards being included in the first card group corresponding to the first non-player character of the opponent based on the result of the card battle game, wherein the second card is assigned to the player.

4. A non-transitory computer-readable information storage medium storing a program, the program causing a computer to perform a method comprising:

executing a card battle game based on a first plurality of cards that are included in a first card group that is used by a first non-player character of an opponent and a second plurality of cards included in a second card group that is used by a player;

assigning a portion of identification data to the player based on a result of the card battle game, the portion of the identification data identifying content of the first card group corresponding to the first non-player character of the opponent, wherein the identification data identifies a plurality of content of the first card group corresponding to each of a plurality of non-player characters comprising the first non-player character;

assigning a first card to the player based on the result of the card battle game, the first card being included in the first card group corresponding to the first non-player character of the opponent;

setting the first card group corresponding for one of the plurality of non-player characters as a card group that is used by the player based on the portion of the identification data and the first card that is assigned to the player;

changing the first card group used by the first non-player character of the opponent to produce a changed card group based on a status of proceeding of the card battle game, wherein the first card assigned to the player are included in the changed card group used by the first non-player character of the opponent, and wherein, in response to the first card group used by the first non-player character of the opponent being changed, assigning the identification data corresponding to the changed card group to the player based on the result of the card battle game; and assigning a second card included in the changed card group to the player based on the result of the card battle game.

5. An information processing device comprising:
a processor; and
a memory connected to the processor, wherein the memory comprises a program configured to perform a method comprising:
  executing a card battle game based on a first plurality of cards that are included in a first card group that is used by a first non-player character of an opponent and a second plurality of cards included in a second card group that is used by a player;
  assigning a portion of identification data to the player based on a result of the card battle game, the portion of the identification data identifying content of the first card group corresponding to the first non-player character of the opponent, wherein the identification data identifies a plurality of content of the first card group corresponding to each of a plurality of non-player characters comprising the first non-player character;
  assigning a first card to the player based on the result of the card battle game, the first card being included in the first card group corresponding to the first non-player character of the opponent,
  setting the first card group corresponding for one of the plurality of non-player characters as a card group that is used by the player based on the portion of the identification data and the first card that is assigned to the player;
  changing the first card group used by the first non-player character of the opponent to produce a changed card group based on a status of proceeding of the card battle game;
  wherein the first card assigned to the player are included in the changed card group used by the first non-player character of the opponent, and
  wherein, in response to the first card group used by the first non-player character of the opponent being changed, assigning the identification data corresponding to the changed card group to the player based on the result of the card battle game; and
  assigning a second card included in the changed card group to the player based on the result of the card battle game.

6. A control method comprising:
  executing a card battle game based on a first plurality of cards that are included in a first card group that is used by a first non-player character of an opponent and a second plurality of cards included in a second card group that is used by a player;
  assigning a portion of identification data to the player based on a result of the card battle game, the portion of the identification data identifying content of the first card group corresponding to the first non-player character of the opponent, wherein the identification data identifies a plurality of content of the first card group corresponding to each of a plurality of non-player characters comprising the first non-player character;
  assigning a first card to the player based on the result of the card battle game, the first card being included in the first card group corresponding to the first non-player character of the opponent;
  setting the first card group corresponding for one of the plurality of non-player characters as a card group that is used by the player based on the portion of the identification data and the first card that is assigned to the player;
  changing the first card group used by the first non-player character of the opponent to produce a changed card group based on a status of proceeding of the card battle game;
  wherein the first card assigned to the player are included in the changed card group used by the first non-player character of the opponent, and
  wherein, in response to the first card group used by the first non-player character of the opponent being changed, assigning the identification data corresponding to the changed card group to the player based on the result of the card battle game; and
  assigning a second card included in the changed card group to the player based on the result of the card battle game.

* * * * *